April 12, 1955
E. G. LAYER
2,706,141
CARD INDEX CABINET
Filed Aug. 3, 1950
10 Sheets-Sheet 1
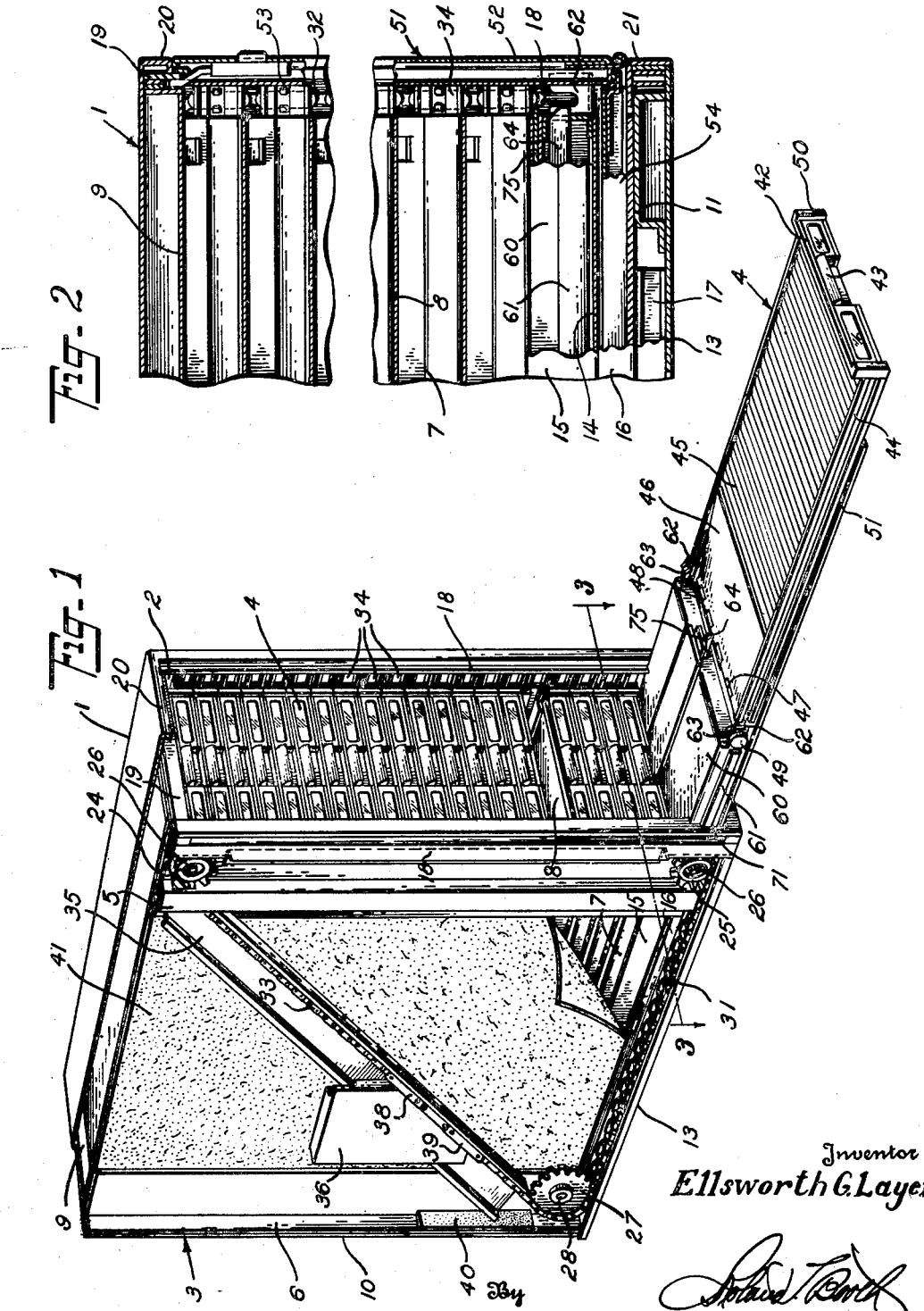
Inventor
Ellsworth G. Layer

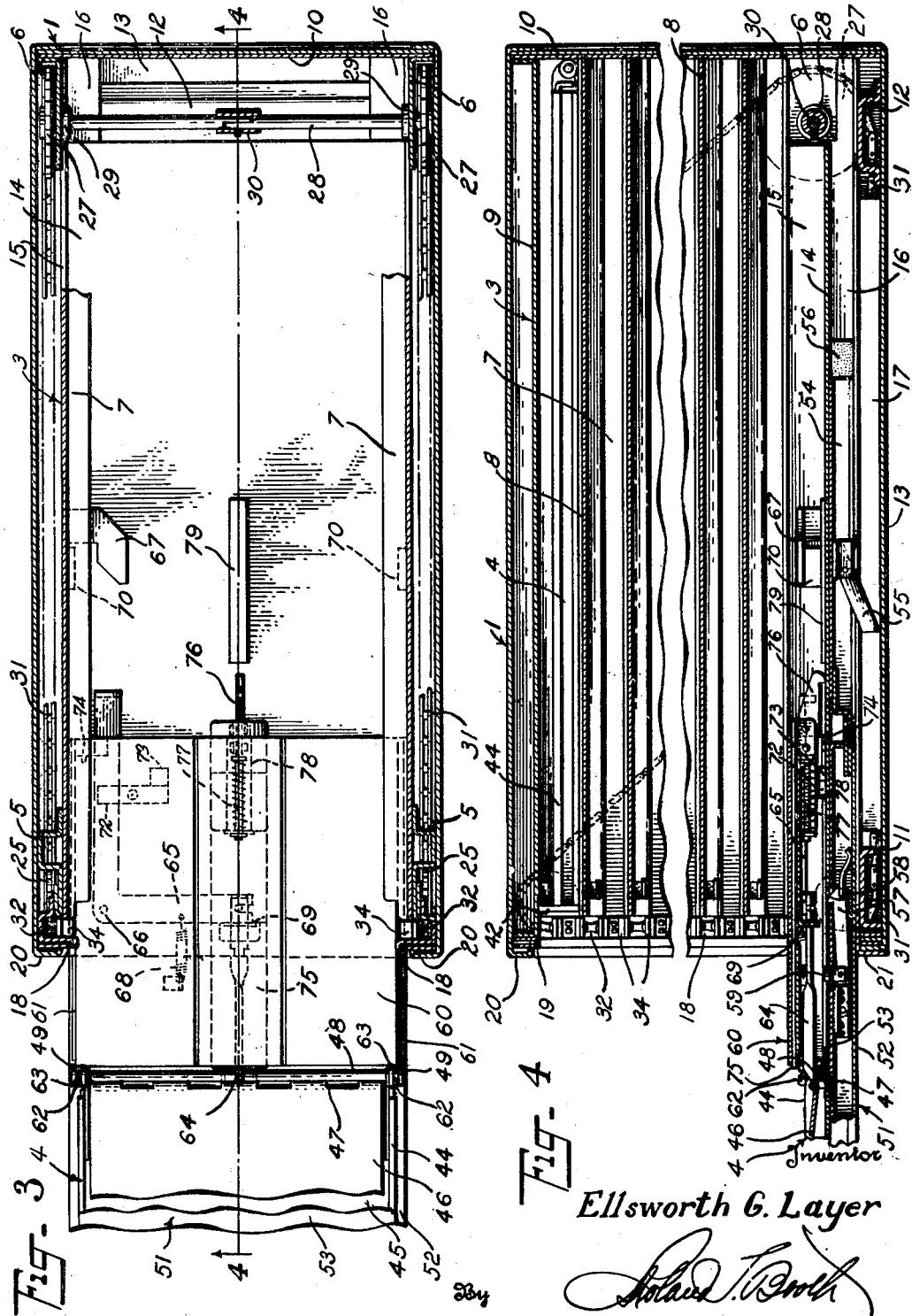

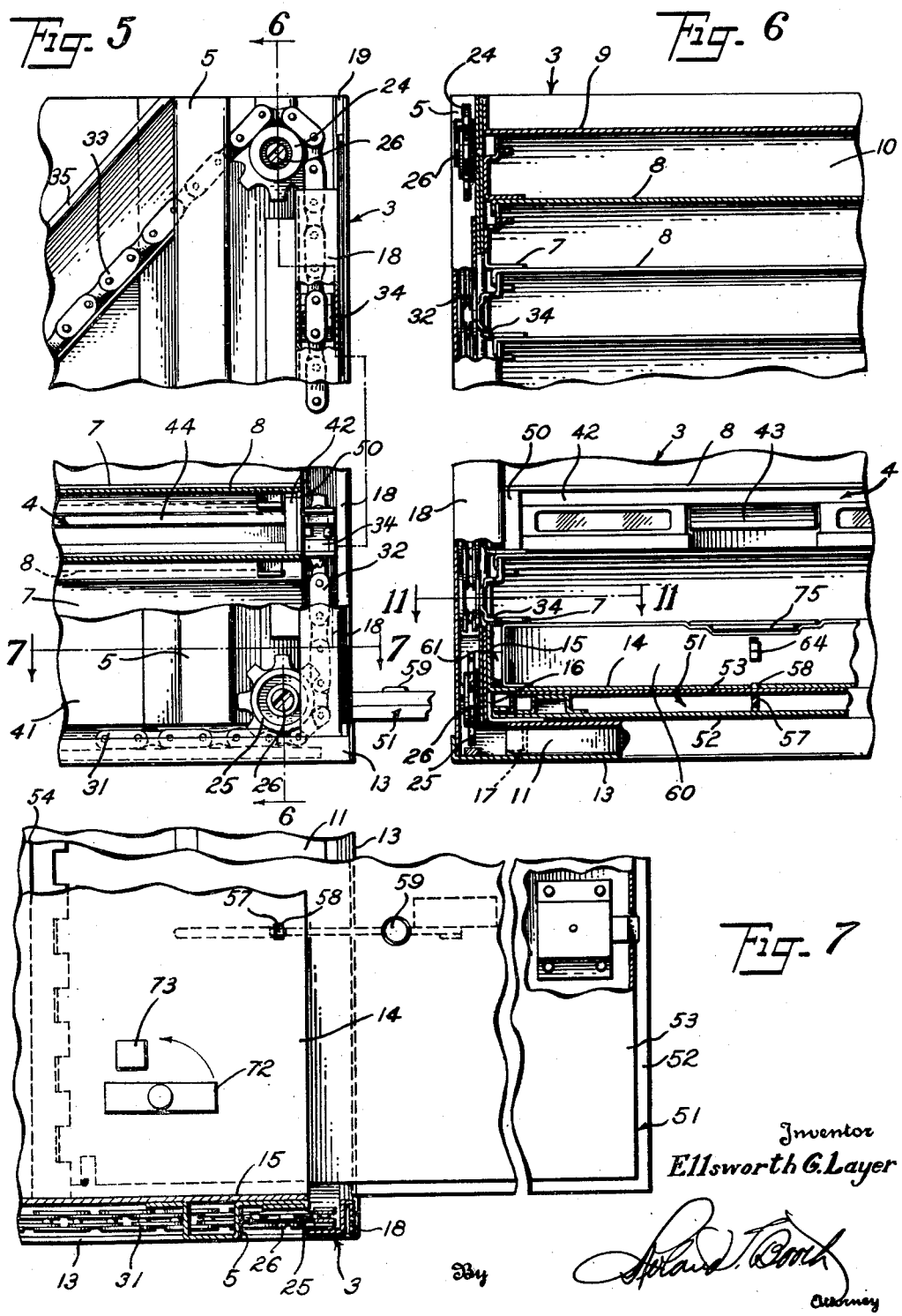

April 12, 1955     E. G. LAYER     2,706,141
CARD INDEX CABINET
Filed Aug. 3, 1950     10 Sheets-Sheet 4

Inventor
Ellsworth G. Layer
By
Attorney

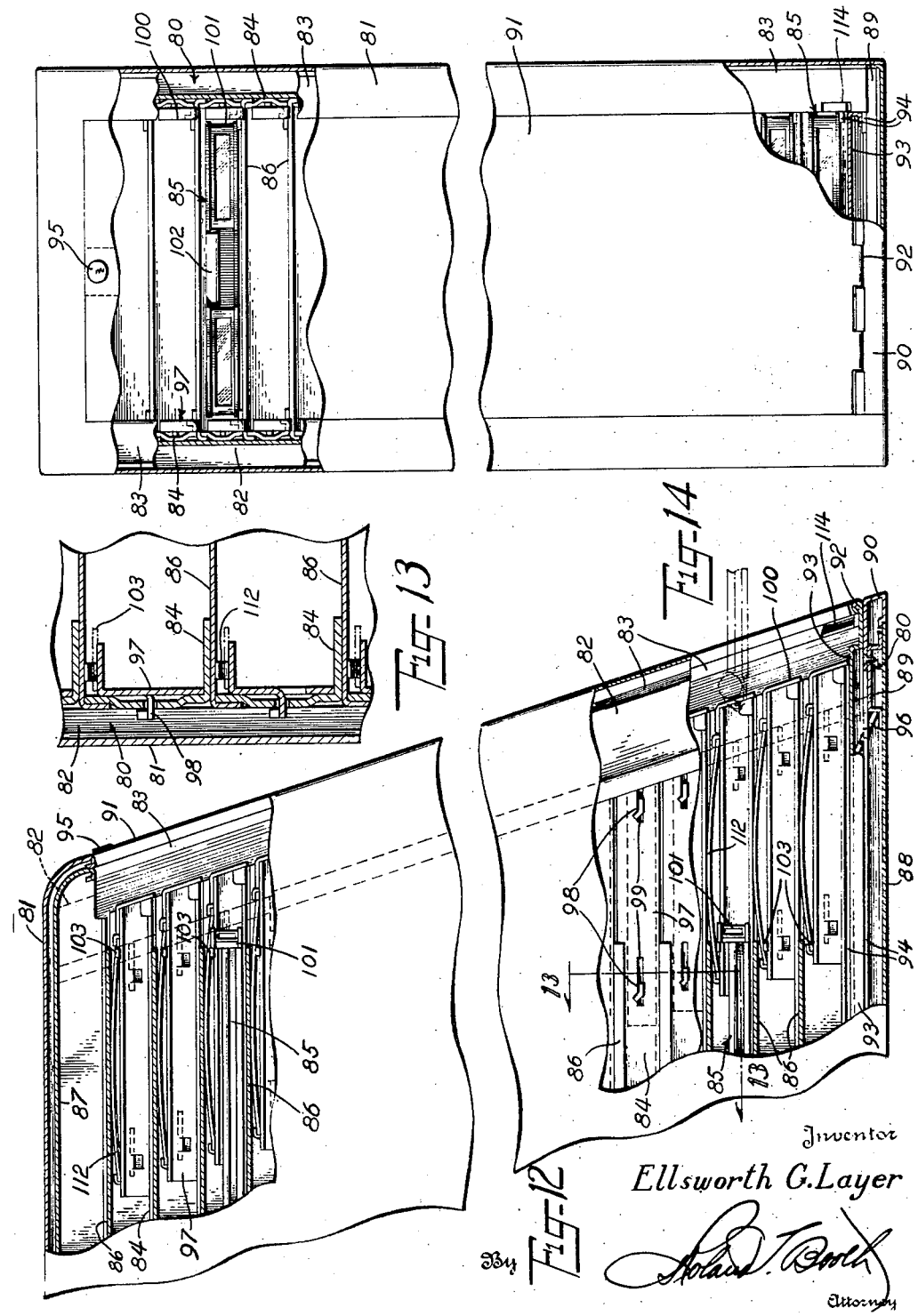

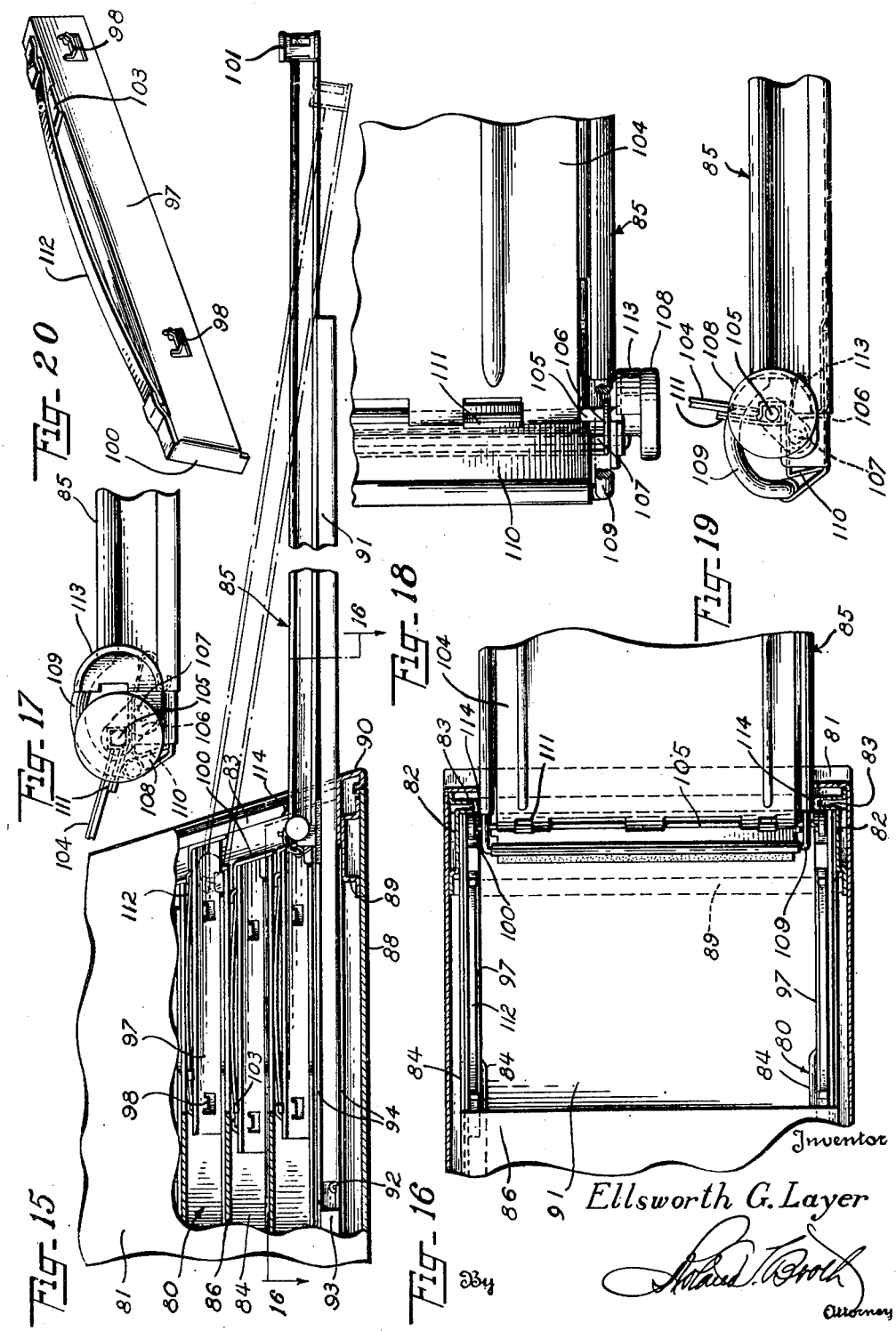

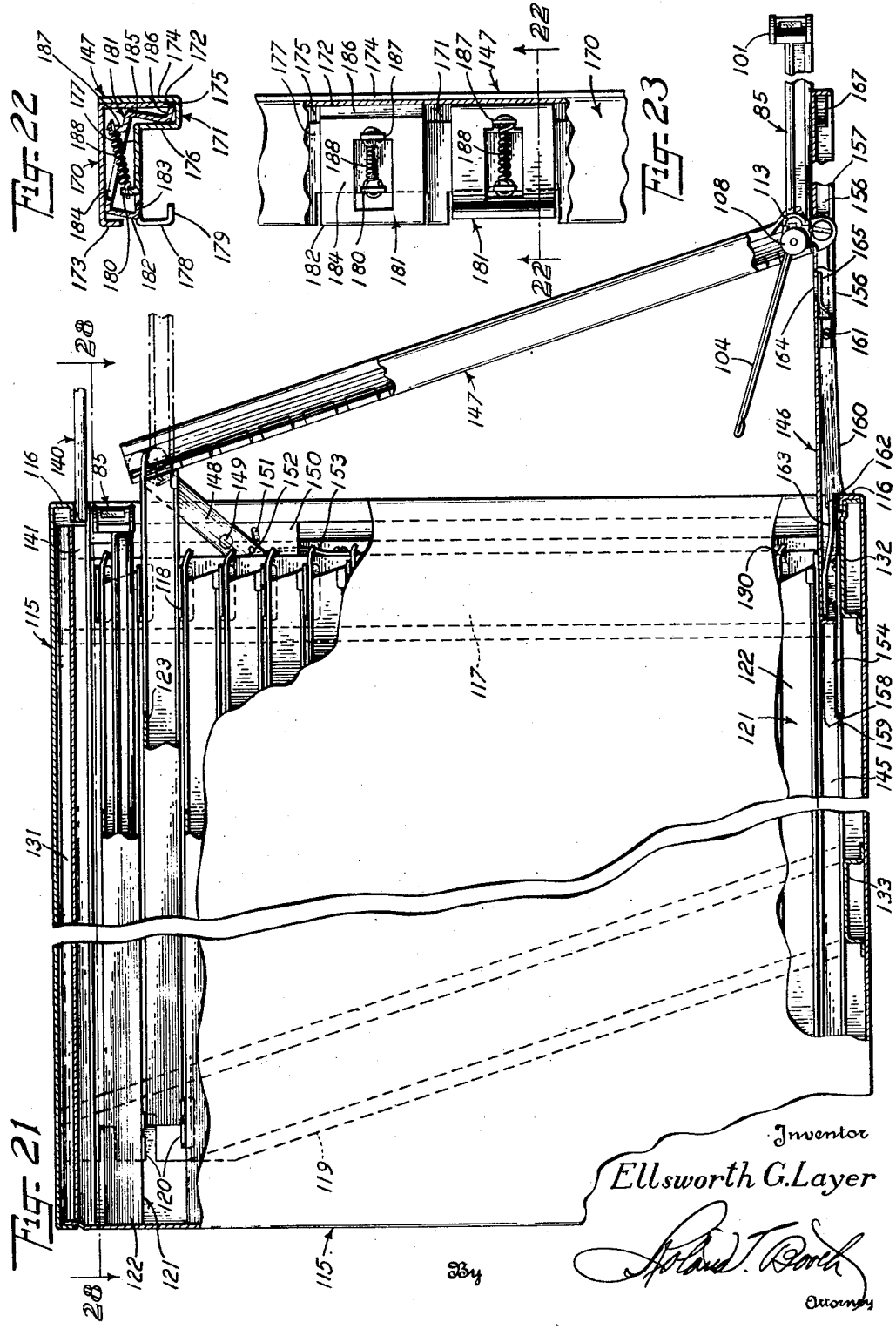

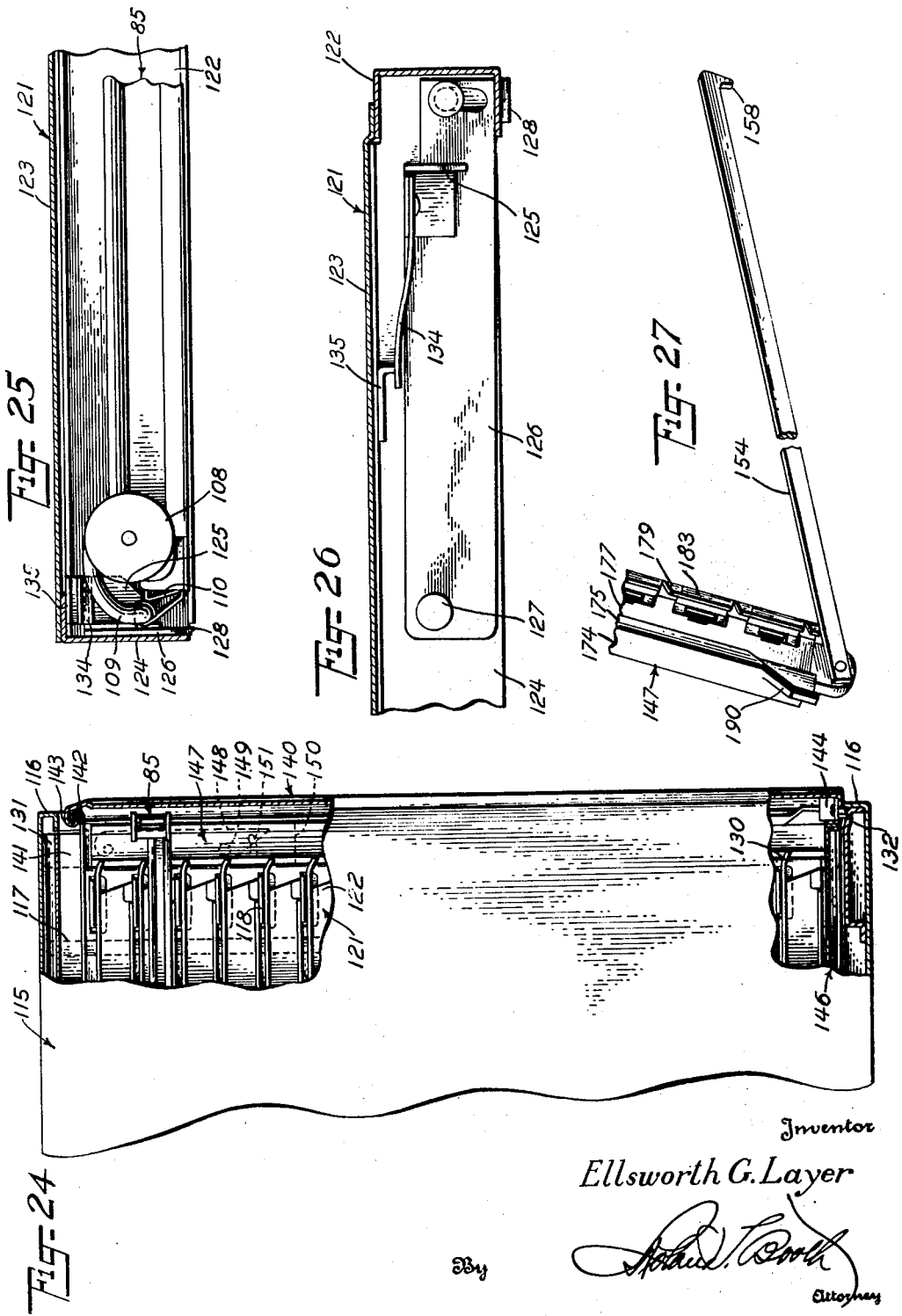

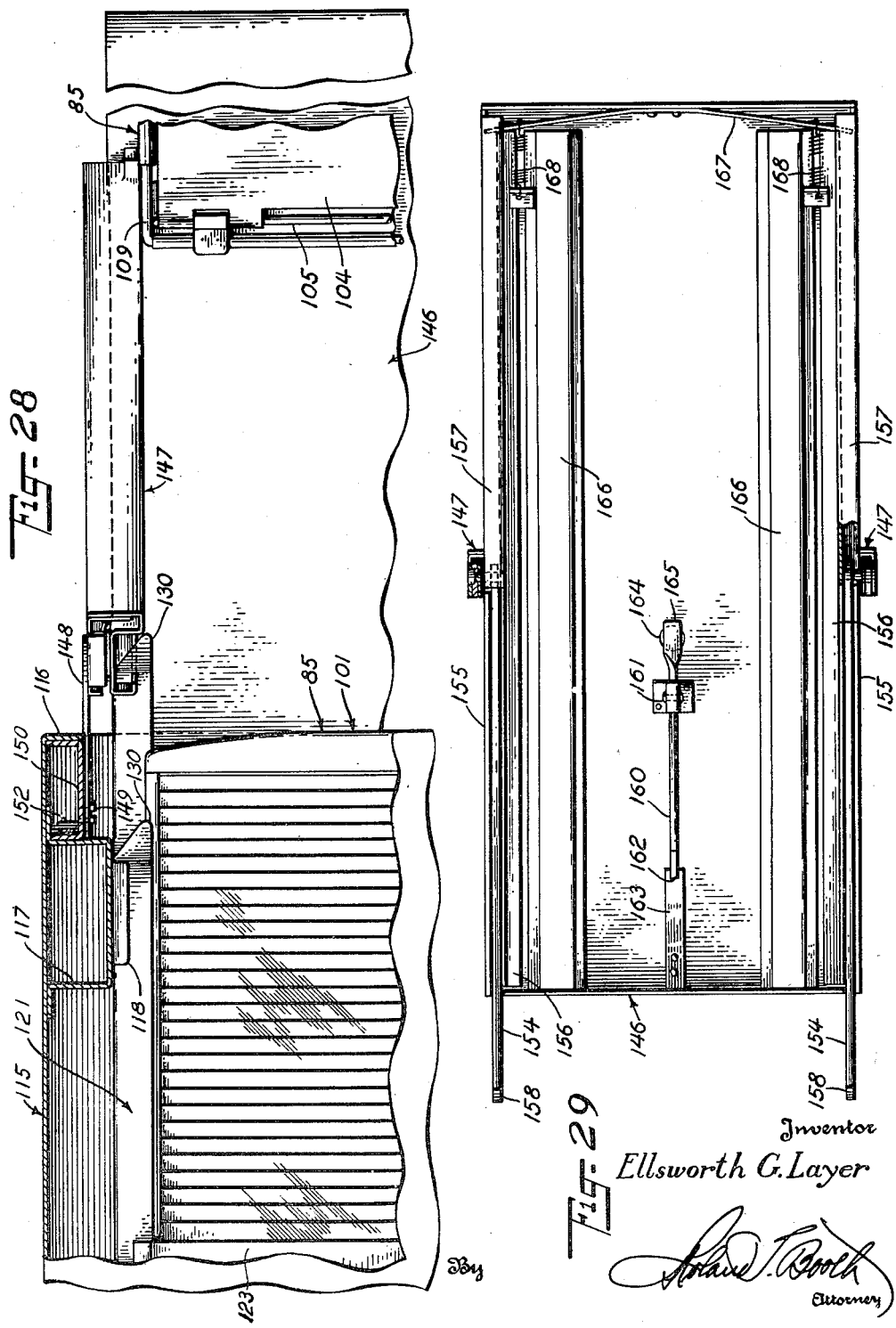

April 12, 1955     E. G. LAYER     2,706,141
CARD INDEX CABINET
Filed Aug. 3, 1950     10 Sheets-Sheet 10
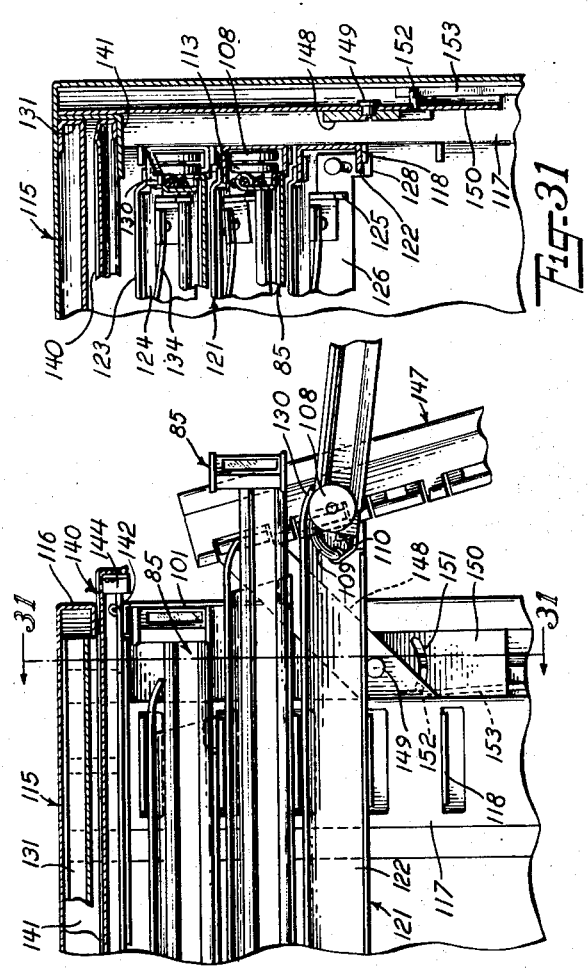
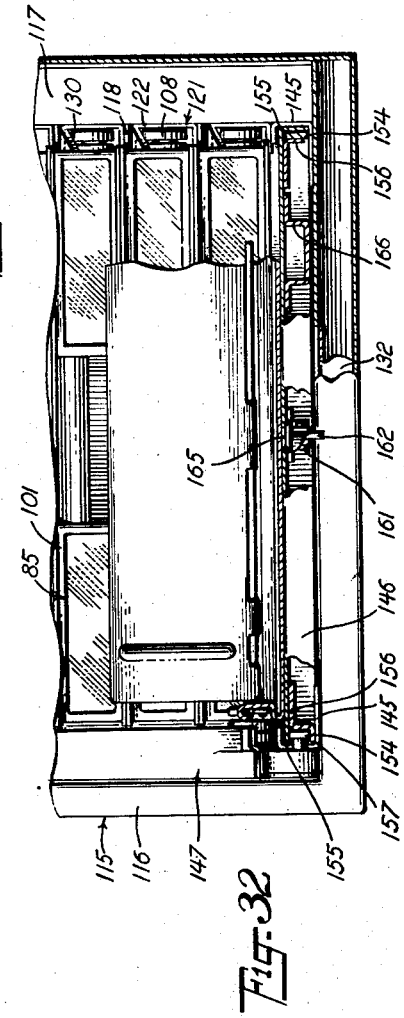
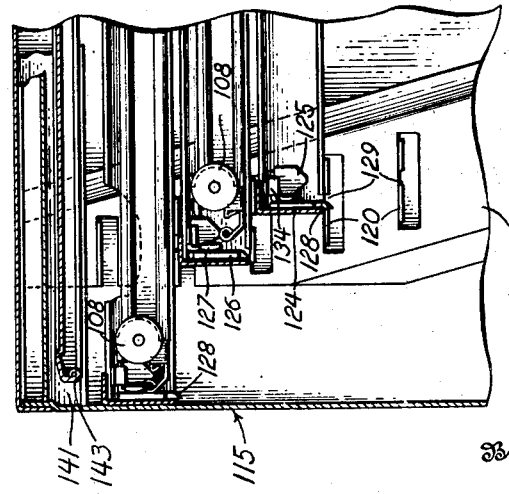
Inventor
Ellsworth G. Layer United States Patent Office 2,706,141
Patented Apr. 12, 1955

2,706,141

CARD INDEX CABINET

Ellsworth G. Layer, Kenmore, N. Y., assignor to Remington Rand Inc., New York, N. Y., a corporation of Delaware Application August 3, 1950, Serial No. 177,539

40 Claims. (Cl. 312—311)

This invention relates to card index files, and more particularly, to a file cabinet construction for visible indexes.

The invention provides a file cabinet for visible indexes wherein the trays, carrying the index cards in visible relation, are arranged in the cabinet in substantially horizontal relation one above the other. Suitable means is provided at the front of the cabinet, and on the trays, for retaining the trays against complete detachment from the cabinet when any tray is withdrawn for inspection of the records therein. This retaining means provides for the movement of any tray up and down in attached relation to the cabinet and in front of the other trays in the cabinet for positioning each tray at a desired level along the front of the cabinet so that the operator of the index may position any tray in the cabinet at the desired level during inspection and posting of the records in the trays. This supported position for a withdrawn tray may be either one where the operator stands up during the inspecting and posting operations of the records or where the height of the tray above the floor or other supporting surface provides for the operator to use the records in a sitting position and at a constant level.

The invention thus provides an improved visible file construction wherein any withdrawn tray may be moved by an operator into a constant posting level or position for reference to, and posting of, the records therein.

The invention is designed to provide for rapid operation of the trays into the supported position for inspection and posting of the records therein and their return to the proper compartments in the cabinet through the exertion of the least possible effort.

The invention comprehends the provision of a card index file wherein the rear end of each tray is provided with means to travel in suitable guides on the cabinet for movement from a housed position to a position wherein a selected tray projects outwardly in front of the cabinet but is retained in connection therewith at the rear end against detachment for traveling movement of the tray down and up in front of the remaining trays in the cabinet to the bottom portion thereof or to any other desired position between its housed position and the bottom of the cabinet for support in a substantially horizontal or similar desired position convenient for reference and posting of the records carried by the tray. The construction is arranged to provide for easy and rapid return of the tray after inspection of the records to its position in the cabinet.

The invention provides for the operation of card index trays from a housed position in a cabinet to a projected position in front of the cabinet in which each tray may be moved into the same position for inspection of the records therein and returned to their respective positions in the cabinet by different types of mechanism such as guideways extending from the top to the bottom at the front of the cabinet with suitable means to provide for the travel of the rear end of the tray in said guideways in such a way that the entire weight of the tray does not have to be lifted to elevate the tray from a lower position to a higher one, either by means of counter-weighted linearly movable members in the guideways engaging and operating the trays therein as well as by means of inclined guideways that will provide for the support of part of the weight of the tray while it is being pushed up the incline into its housed position in the cabinet.

The invention provides for the automatic operation of mechanism, in the withdrawal and return of a tray from its housed position in the cabinet, to guide the tray into suitable guideways extending up and down in front of the trays so the trays may be elevated and lowered relative to the height of the cabinet to a predetermined position for examination and posting of the records therein, and then returned to the compartment from which the tray has been withdrawn. The mechanism is operated automatically in the movement of the tray so as to eliminate the necessity for additional manual operation to secure guiding of the tray in its operation to the projected position in front of the cabinet and return to the housed position.

The invention provides a cabinet construction that facilitates support and operation of the trays and a mounting for the mechanism that cooperates with the trays, to secure the operations referred to above, and at the same time, provides access to all of the parts of the mechanism in a convenient manner so that they may be adjusted or repaired. In carrying out this idea, the cabinet may be constructed in sections to provide an inner tray supporting unit and an outer casing covering said inner unit arranged, constructed, and assembled in such a manner that the outer casing can be readily removed from the inner unit to expose all of the mechanism for mounting and guiding the trays in their movement into and out of their respective compartments in the cabinet. This construction also provides for the convenient manufacture and assembly of the parts with a minimum of labor.

In the drawings:

Fig. 1 shows a cabinet constructed according to the invention in perspective, with portions broken away to illustrate details of construction, one of the trays being shown in withdrawn position from its compartment and supported for inspection and posting of the records housed therein.

Fig. 2 is a vertical fragmentary longitudinal cross-section of the cabinet shown in Fig. 1 on an enlarged scale with the trays omitted and the cover shown in closed position.

Fig. 3 is a horizontal cross-section taken substantially on line 3—3 of Fig. 1, the scale being enlarged.

Fig. 4 is a vertical cross-section taken on line 4—4 of Fig. 3.

Fig. 5 is an enlarged fragmentary side elevation of the front portion of the inner unit of the cabinet with parts broken away and shown in section to illustrate details of construction.

Fig. 6 is a cross-section taken substantially along the line 6—6 of Fig. 5.

Fig. 7 is a fragmentary cross-section taken on line 7—7 of Fig. 5.

Fig. 8 is an enlarged fragmentary side elevation of the rear lower corner portion of the inner unit with portions broken away and shown in section to illustrate details of construction.

Fig. 9 is a fragmentary cross-section of the cabinet at the rear lower corner taken on line 9—9 of Fig. 8.

Fig. 10 is a fragmentary cross-section taken on line 10—10 of Fig. 8.

Fig. 11 is a cross-section taken substantially on line 11—11 of Fig. 6 showing a fragment of the front portion of the cabinet and a fragment of a withdrawn tray at the rear end, illustrating how the rollers on the rear end of the tray engage in the holders on the endless chain member and ride in the guideways for movement up and down at the front of said cabinet.

Fig. 12 is a fragmentary side elevation of the front portion of a modified form of cabinet construction with portions broken away and shown in cross-section to illustrate details of construction, the cover for the front of the cabinet being shown in closed position.

Fig. 13 is a fragmentary cross-section on an enlarged scale taken on line 13—13 of Fig. 12.

Fig. 14 is a fragmentary front elevation of the cabinet shown in Fig. 12 with portions broken away and shown in section to illustrate details of construction.

Fig. 15 is a fragmentary side elevation of the lower front corner of the cabinet as shown in Fig. 12 with portions broken away and shown in section to illustrate details of construction, the cover being moved into the open position to provide a support at the bottom of the cabinet for a withdrawn tray.

Fig. 16 is a cross-section taken on line 16—16 of Fig. 15.

Fig. 17 is an enlarged fragmentary side elevation of the rear end of a card index tray used in the cabinet illustrated in Figs. 12 to 16, showing the structure that travels in the guideways for guiding a tray in its movement into withdrawn position.

Fig. 18 is an enlarged fragmentary plan view of the rear corner of a card index tray constructed as shown in Fig. 17.

Fig. 19 is a view similar to Fig. 17 showing another position of the parts in the operation of the top cover from a rearwardly extending open position toward closed position.

Fig. 20 shows one of the slide members used in the cabinet shown in Figs. 12 to 16, in perspective.

Fig. 21 is a fragmentary side elevation of a cabinet embodying another form of the invention, with portions broken away and shown in section to illustrate details of construction, the cover for the cabinet being shown in the open position, and the guideways being shown in their forwardly projecting operative position for guiding trays in their withdrawn position for use.

Fig. 22 is a cross-section taken on line 22—22 of Fig. 21, the scale being substantially enlarged.

Fig. 23 is a side elevation of a fragmentary portion of the guideway structure shown in Fig. 22.

Fig. 24 is a fragmentary side elevation of the front end of the cabinet shown in Fig. 21, with portions broken away and shown in section to illustrate details of construction, with the parts shown in position with the cover closed.

Fig. 25 is an enlarged vertical cross-section through the rear end of one of the slide members used in the cabinet shown in Figs. 21 to 24, illustrating how the rear end of the tray releases the slide retaining means for free sliding movement of the slide member in the cabinet.

Fig. 26 is a view similar to Fig. 25 looking at the opposite side of the rear end of the slide member, the tray being omitted for the purpose of illustrating details of construction of the latch for the slide member.

Fig. 27 shows a fragmentary portion of the lower end of the guideway used in the cabinet shown in Figs. 21 to 24, in perspective, with the retaining hook that limits the forward movement of the lower end outwardly beyond the front of the cabinet.

Fig. 28 is a horizontal cross-section taken on line 28—28 of Fig. 21.

Fig. 29 is a bottom plan view on an enlarged scale of the tray supporting member at the bottom of the cabinet in the form of the invention shown in Figs. 21 to 28.

Fig. 30 shows an enlarged fragmentary vertical longitudinal cross-section through the upper portion of the cabinet illustrated in Fig. 21 to more fully illustrate details of construction.

Fig. 31 is a cross-section taken on line 31—31 of Fig. 30.

Fig. 32 shows an enlarged fragmentary front elevation of the bottom portion of the cabinet illustrated in Fig. 21 with portions broken away and shown in cross-section with a tray portion shown in extended posting position attached to the supporting panel in extended position.

One construction for incorporating the features of the invention is illustrated in Figs. 1 to 11 inclusive. In this construction the cabinet is of rectangular form with a substantially vertical front which is open. The cabinet is constructed of two main parts, an outer casing 1 including sides, top, back and front walls. The front wall is formed with an opening 2. An inner unit 3 provides the main supporting structure for card index trays 4 and the mechanism for supporting and guiding the trays into and out of the cabinet.

Inner unit 3 has front uprights 5 and rear uprights 6 at the front and rear corners of the sides of the unit extending from the top to the bottom thereof. These uprights are made of sheet metal, the rear upright being of angle form and the front upright having a central portion formed into channel shape in cross-section. A plurality of horizontal guide channels 7, see Figs. 4 and 6, are constructed in opposing pairs arranged at opposite sides of the inner unit. A plurality of pairs of channels 7 are arranged in successive order one on top of another and provide guides for receiving and supporting trays 4 in the cabinet. Partitions 8 extend between opposite sides of inner unit 3 and have the ends provided with depending side flanges engaging over the upper edges of each pair of channel members 7 in the manner shown in Fig. 6. Channels 7, after being assembled with partitions 8 are spot-welded to uprights 5 and 6 to provide a rigid inner unit construction having a plurality of substantially horizontal compartments for receiving a tray in each compartment one above the other in a manner that each tray may be slidably moved into and out of the compartment.

A top member 9 is provided on inner unit 3, as shown in Figs. 4 to 6, having edge flanges on all sides thereof extending upwardly and suitably secured by spot-welding or the like to uprights 5 and 6. A back wall 10 is mounted at the back of the inner unit against the ends of channels 7, partitions 8 and rear edges of rear uprights 6 and suitably secured by spot-welding or the like, to uprights 6 and the rear edge flange on top 9. This provides a closure for the rear ends of all of the compartments to limit the movement of the card index trays in the cabinet. Bottom channels 11 and 12 extend between, and are secured to, the lower ends of the front and rear uprights 5 and 6, respectively, and a bottom wall 13 is mounted on channels 11 and 12 to provide a closed bottom on inner unit 3. Bottom wall 13 has upstanding flanges on the side, front, and rear edges thereof that extend around the inside of the lower ends of the sides and front wall portions of outer casing 1 and outside of back 10.

Guide channels 7 do not extend to the bottom of the cabinet as may be determined by inspecting Figs. 4 and 6. Below the bottom pair of guide channels 7 and at the bottom of the cabinet there is a bottom partition member 14 formed with upwardly extending side flanges 15 suitably secured to uprights 5 and 6, the rear end of the member terminating in spaced relation in advance of the rear end of the cabinet to provide a compartment in the rear lower corner of the cabinet. A pair of angle members 16 is arranged at opposite sides of the cabinet below partition member 14 and suitably secured to uprights 5 and 6 and channel members 12 at each side of the cabinet by spot-welding or the like. One flange of angle member 16 is seated on top of channels 11 and 12 extending across the bottom of the cabinet and provides a means for spacing bottom partition member 14 at the desired distance above the bottom of the cabinet. Channel members 17 extend along opposite sides of bottom 13 of the cabinet between channels 11 and 12 and are secured to the horizontal flanges of angle members 16 in order to provide a support under the side portions of inner unit 3 for the weight of the cabinet structure on bottom 13. These channels 17 are spaced inwardly from the edge flanges on bottom 13, see Fig. 6, to provide passages along the bottom of the cabinet at opposite sides thereof, for a purpose that will be hereinafter described.

At the front of inner unit 3, a pair of vertically extending guideways 18 is mounted on front uprights 5. Guideways 18 are formed of channel shape in cross-section with the channels of each guide at opposite sides of the cabinet arranged in opposed relation, as shown in Fig. 3. The channel portions of guideways 18 are in front of the front edges of uprights 5 and form the front end of inner unit 3, extending from the top to the bottom of said unit. A filler strip construction indicated at 19 in Fig. 4, is mounted on the front face of the front flange on top wall 9 to extend between the upper ends of channel members 18 and provide a flush face on the front of inner unit 3 defining the front opening in the cabinet.

The front edge of outer casing 1 is provided with inwardly extending flanges at the top and sides thereof as indicated at 20 in Figs. 3 and 4. These flanges 20 extend around guideways 18 at the outer sides thereof but terminate short of the inner edges that define the opening in the front of the cabinet, as clearly shown in Fig. 3. The inner edges of flanges 20 are turned inwardly, as shown in Figs. 3 and 4, to engage the front face of guides 18 and filler 19, thereby finishing the front face or wall of the cabinet. An angle strip 21 joins the lower front ends of the sides and flanges 20 of casing 1, with one portion of the angle strip extending rearwardly into the cabinet, as shown in Fig. 4, for engagement on the top of channel member 11 extending across the front end of inner unit 3 in the assembled relation of outer casing 1 on inner unit 3. Suitable means may be provided in the form of screws or the like for detachably connecting the inwardly extending flange of angle member 21 to channel member 11 and for securing the front end of outer casing 1 to inner unit 3 to retain these parts in assembled relation. The rear end of casing 1 is secured to inner unit 3 at the bottom edge of the rear wall by having suitable screws or the like extended through openings in the lower margin of the rear wall into the upstanding rear flange on bottom 13. Outer casing 1 is assembled and disassembled from inner unit 3 by sliding the same on and off of inner unit 3 from the top thereof.

Upper and lower sprockets 24 and 25 respectively, are rotatably mounted on studs 26 carried by the upper and lower ends of uprights 5 in a position so that the periphery of each sprocket wheel will be aligned at one point with the channels in guideways 18. Sprocket wheels 27 are arranged at opposite sides of inner unit 3 at the rear lower end of the cabinet in alignment with sprocket wheels 24 and 25. All of these sprocket wheels are on the outside of inner unit 3 and are covered by casing 1 in the assembled relation of casing 1 on the inner unit.

Sprockets 27 are mounted on shaft 28 rotatable in bearings 29 at opposite sides of inner unit 3. The central portion of shaft 28 is provided with an overlapping slit portion contained within sleeve 30, see Fig. 3, carrying a set-screw for providing a means whereby the length of the shaft may be varied to position sprockets 27 in properly aligned relation with sprockets 24 and 25 to secure smooth operation of the sprockets. Endless members, illustrated as chains 31, are mounted on sprocket wheels 24, 25, and 27 at each side of inner unit 3 for travel thereon. Each chain 31 has a vertical portion 32 extending between sprocket wheels 24 and 25 and guided in the channel portion of guideways 18. The portion of chain 31 extending from sprocket wheel 24 to sprocket wheel 27 extends from sprocket wheel 24 rearwardly and downwardly as indicated at 33, Fig. 1, to provide an inclined section of said chain or flexible member.

The vertical sections 32 of chain 31 carry a plurality of holders 34, see Fig. 6, in the form of U-shaped members that are arranged on the inside edge of each chain so as to face toward each other and to be received and guided in guideways 18. The number of clips on each section 32 of chain 31 are equal in number to the number of trays in the cabinet. When the chain is arranged in its normal position of rest, these holders are in alignment with guide channels 7 so that each holder on each chain is arranged opposite one tray in position to receive said tray and support the same upon its being withdrawn from its compartment in the cabinet. The top and bottom portions of uprights 5 and guideways 18 are cut away and recessed to provide space to receive sprockets 24 and 25 and also to provide for passage of chain 31 over the sprockets and toward sprocket 27.

Trackways 35 of channel form are mounted on the outer sides of inner unit 3 in diagonal relation extending from the top portion of uprights 5 to the lower portion of uprights 6 and are suitably spot-welded or otherwise secured thereto. These trackways are parallel to the inclined section 33 of chains 31 and receive these inclined sections of the chain adjacent one flange thereof. This feature of construction is well illustrated in Figs. 1, 5, and 8. The opposite flange of each trackway 35 supports an operating weight member 36 for traveling movement thereon through the medium of suitable rollers 37, see Fig. 8, rotatably mounted on weight 36. Weight 36 is provided at its lower edge with an inclined portion that detachably receives links 38 and 39 carried by the ends of the chain and provides a means for attaching the chain to weight 36 for adjustment of the links of the chain to take up slack. One edge of each weight 36 is adapted to engage one of the flanges of rear upright 6 as the weights reach the lower end of trackways 35 for limiting the movement of the weights and the chain and normally tending to retain the chain in a normal position with the weights supported against upright 6. In this normal position holders 34 on vertical portion 32 of chain 31 are arranged in position so that each holder on each chain is opposite one of the trays in the cabinet.

Both chains are operated simultaneously by means of the shaft connection 28 between sprockets 27. Suitable means 40 in the form of a piece of cord, felt, or the like may be mounted on the base of rear support 6 to receive weights 36 as they reach the bottom of their travel on trackways 35 to provide a bumper for stopping the weights at the lower ends of the trackways and eliminating noise. The portion of the chain extending between sprocket wheels 25 and 27 is arranged at the bottom of the cabinet as shown clearly in Figs. 1, 8, and 9, for example, and is arranged to travel adjacent the upstanding flanges on the side edges of bottom 13 and on the outside of channels 17 secured thereto. Suitable sound deadening sheet material 41 may be applied to the outside of channels 7, Fig. 1, to absorb and reduce the noise of the operation of trays 4 in the cabinet and also the operation of chains 31.

Each tray 4 has a front wall 42 provided with a handle 43 in the central portion and label holders at opposite sides thereof in a manner well known in the art, while side walls 44 are of the usual channel type construction to provide channels along the side edges of the tray to receive a plurality of offset overlapping card holders and cards indicated at 45 in Fig. 1. A top cover 46 is hingedly mounted on hinge rod 47 at the rear end of the tray for movement into the tray into a forwardly extending position, in a manner well known in the art, to cover the top card of the series of index cards and holders indicated at 45 in the tray. When the tray is to be used, it is desirable to swing cover 46 upwardly and rearwardly so that card holders 45 and the cards may be swung about their hinged mounting in the tray, in a manner well known in the art, for the inspection and entry of any desired information. The rod 48 extends across the rear end of the tray at the rear of hinge rod 47. Rollers 49 are rotatably mounted on opposite ends of rod 48. Rollers 49 are arranged on the tray to travel in guide channels 7 and to engage in holders 34 on chains 31.

Rollers 49 also travel in guideways 18 on the front of inner unit 3 for guiding the rear end of each tray up and down in guideways 18. These rollers are also arranged so that in their travel in guideways 18 they will also engage track sections 50 carried at opposite sides on fronts 42 of other trays. Track sections 50 provide a continuous track up and down the front of the cabinet in cooperation with guideways 18 in the closed position of the trays, to close all of the tray compartments and prevent the entry of a tray therein except the one from which the withdrawn tray has been previously removed.

Chains 31 provide for the support of the rear end of a tray in holders 34 when any tray in the cabinet is withdrawn from its housed position. In the withdrawal of a tray rollers 49 travel in guide channels 7 at opposite sides of inner unit 3 until they reach the front ends of these guides where the rollers then become engaged in holders 34. Guideways 18 limit the outward movement in the withdrawal of a tray from the cabinet to prevent complete detachment of the tray therefrom. While the front end of a tray is being manually held it may be lowered and upon the lowering movement thereof, the weight of the tray will be sufficient to substantially balance weight 36 so that with slight effort the tray may be moved up and down in the cabinet from the point from which it has been withdrawn to the bottom of the cabinet. The tray may be supported for reference and use of the records therein at the lower ends of guideways 18 in a manner that will now be described.

A front closure 51 is provided for closing the front opening in the cabinet. This closure includes an outer panel 52 and a spaced parallel inner panel 53 formed of sheet metal having its edges offset toward outer panel 52 and suitably secured thereto around the margins to form an angular seat extending around the edges of the cover. In the closed position, the outer margin of the cover will seat in the opening in casing 1 against the outer face of inner unit 3 with inner panel 53 extending into the opening formed by guides 18 at the front of the inner unit. Closure 51 is hingedly connected at its lower end to an end section 54. End section 54 is provided at the side edges with lateral extensions having the edges inturned to form channel portions at opposite sides for slidable engagement below bottom partition member 14 in angle members 16 in the same manner as closure 51, see Fig. 4. End section 54 carries a pivoted latch 55 on the under-face in the central portion that normally gravitates downwardly toward bottom 13 and is adapted to engage channel member 11 at the bottom of inner unit 3 for normally limiting the forward sliding movement of end section 54. The hinge connection of closure 51 with end section 54 will be limited so as to be properly positioned at the front of the cabinet for the hinging movement of the closure into position to close the front opening in casing 1. The upper end of the cover may be provided with a suitable key-operated lock, shown diagrammatically in Fig. 2, for securing it in the closed position. An aperture, not shown, may be provided in end section 54 over latch 55 for insertion of a tool to engage and hold latch 55 in inoperative position when it is desired to remove end section 54 and the closure from assembly on the cabinet.

To move the cover to open position it is first unlocked and then swung downwardly into a horizontal position whereupon it may be slid inwardly into the bottom of the cabinet. The inward movement is limited by end section 54 having its rear end engage stops 56 mounted on the vertical sides of angle members 16. Stops 56 are positioned so that only the end portion of closure 51 extends into the cabinet while the major portion thereof projects in a substantially horizontal position outwardly in advance of the front of the cabinet. When this position of the cover is reached, a spring pressed latch 57 carried by inner panel 53 of the closure, as shown in Fig. 4, is projected outwardly through an opening in the inner panel into engagement with a notch 58 in partition 14 near the front edge thereof for retaining the cover in this position.

Latch 57 is moved into the inoperative position by manual operation of button 59 obtained by pressing the button downwardly in the position shown in Fig. 4. After pressing this button down to disengage the end of latch 57 from opening 58, a pull upon the closure will slide it outwardly so that the latch extends in front of partition 14 for the continued outward sliding movement of the closure for subsequent movement into the closed position, as shown in Fig. 2. The end of latch 57 is beveled as shown in Fig. 4. In movement of the closure into the cabinet, the beveled edge will engage the front end of partition 14 and cam the latch under the partition until it reaches opening 58 at which time the latch will engage in the opening and lock the cover in the horizontal projecting position. The closure forms a supporting means in the horizontal projecting position for withdrawn trays projecting forwardly from the front of the cabinet.

The compartment formed by bottom partition member 14 is below the tray compartment in the cabinet and immediately above the compartment that receives the closure. This compartment formed by bottom partition member 14 slidably receives a follower 60. Follower 60 is formed of sheet metal having laterally extending edge flanges on the side and front edges of a substantially flat plate portion, see Figs. 3, 4, and 6. The laterally extending flanges are turned inwardly at the lower edges to provide a sheet metal structure of channel shape formation along the side and front edges of the follower. The lateral side flanges of the follower are of a length equal to the height of the flanges on partition member 14, so that the follower is slidably mounted in the channels at the side of partition member 14. Retaining bars 61, Fig. 1, are mounted on the lower portions of the laterally extending side flanges of follower 60 having a width slightly less than the size of holders 34, so that when the follower is projected forwardly from the cabinet out of its compartment, bar 61 will engage in holders 34 at opposite sides of the cabinet and retain said holders against movement in the guideways.

The front end of follower 60 is provided with tray supporting brackets 62 at opposite sides thereof formed with slots extending downwardly from the upper edges thereof adapted to receive the reduced central portions indicated at 63 of rollers 49 on said index trays, as the rear end of a withdrawn tray reaches the lower ends of the guideways. When a tray has its rollers engaged in tray supporting brackets 62 for attachment to follower 60 it may then be pulled forwardly to withdraw the follower with the tray from the cabinet to advance the position of the tray in front of the cabinet. In this operation, the tray is prevented from being detached from follower 60 as it leaves guideways 18 and holders 34 by tray retaining latch 64 having the free end thereof projecting through a slot in the front lateral flange on the follower in the central portion thereof. This latch is near the top of the follower so that the lower edge will overlie the top portion of the rear end of the tray in its projecting position and retain the tray in attached relation with the follower.

The upper free end of latch 64 is beveled as shown in Fig. 4.

The opposite end of the latch is pivotally connected to one end of bell crank lever 65 having its pivot at 66, Fig. 3, at one side of the follower with the opposite end of the bell crank lever extending in the rear of the follower and provided with a laterally extending end portion adapted to engage lever operating cam 67 carried on one of the side flanges of bottom partition member 14. A coil spring 68 having one end attached to bell crank lever 65 and the opposite end attached to a bracket on the under-face of follower 60 is normally under tension to operate the bell crank levers for projecting latch 64 forwardly out in front of the follower into its normally operative position. The movement of the bell crank lever and latch 64 is limited by a guide projection 69 on the under side of follower 60 which receives and guides the rear end of latch 64 adjacent its point of attachment to bell crank lever 65.

With this latch construction, the free end of latch 64 may be manually engaged and pushed inwardly to disengage from the rear end of a tray attached in bracket 62 so that the tray may be raised upwardly and detached from the follower in its forwardly projected position. By this means a tray may be completely detached from the cabinet. When it is desired to reattach the tray, rollers 49 have the slotted portion 63 engaged in the slots in brackets 62 and moved downwardly in said brackets from the upper ends thereof. In this downward movement of the rear end of the tray and rollers 49 into brackets 62, the rear end of the tray will engage the beveled end of latch 64. This will force latch 64 rearwardly until the reduced portions of rollers 49 engage the bottom of slots in the brackets whereupon the rear end of the tray will be below latch 64 and the spring will return it to its forwardly projecting position latching the tray in attached relation in brackets 62.

When the tray is moved inwardly in the cabinet with the follower, the rear end of the follower engages stops 70 mounted on the side flanges of bottom partition member 14 when it reaches a position with brackets 62 arranged in alignment with guideways 18. Cam 67 is positioned to engage the rear end of bell crank lever 65 in advance of the follower engaging stops 70 so that as the follower completes its rearward movement into engagement with stops 70, bell crank lever 65 will be operated to retract latch 64 into a position where it will not engage over the rear end of a card index tray carried thereby. This provides for the movement of the tray upwardly in engagement with its holders 34 in guideways 18. When follower 60 is engaged with stops 70, retaining bars 61 have moved into a position in the rear of guide 18 releasing holders 34 for movement with the chains upwardly in said guideways so that a tray can be disengaged from follower 60 and moved upwardly in the guideways in attached relation on the cabinet to the compartment from which it was withdrawn.

When the compartment from which the tray was withdrawn is reached, weights 36 will engage strips 40 on the rear uprights 6 of inner unit 3 and stop the movement of chains 31. This arrangement is such that the movement of the chains is arrested opposite each compartment from which a tray is withdrawn and the chains have only the travel in the guideways that is equal to the distance between the position of a withdrawn tray in the cabinet and the bottom thereof where the tray engages in follower 60. Cam 67 retains bell crank lever 65 and latch 64 in the inoperative position while the follower remains in its rear position against stops 70 with tray supporting brackets 62 aligned with guideways 18. This position of the follower is maintained at all times until a tray is engaged therein and the follower is manually pulled outwardly through the front of the cabinet with the tray in order to retain it in attached relation to the cabinet.

The guideways are cut away at the bottom as indicated at 71, see Fig. 1, to provide for the movement of rollers 49 and the follower through the front of the cabinet to project outwardly in the manner shown in Fig. 1. The forward movement of follower 60 is limited by a pair of pivoted stops 72, Fig. 7, mounted on bottom partition 14. Pivoted stops 72 are mounted on top of partition 14 and are adapted to have one end moved into engagement with projections 73 on top of bottom partition 14 so their pivotal movement will be limited with stops 72 extending in a transverse relation across the cabinet. The free end of pivoted stops 72 will then be positioned to extend toward the side flanges of bottom partition 14 in the path of shoulders 74 on the rear portions of the lower inturned edges of the side flanges on follower 60. This arrangement is made so that shoulders 74, Fig. 3, will engage one end of pivoted latches 72 in transversely extending position. This will tend to rotate latches 72 toward stops 73 thereby arresting the movement of the follower in a forwardly projecting direction. The pivoted latches are used so that when the follower is only partly projected in front of the cabinet, latches 72 are accessible from the underside for manual operation into a forwardly and rearwardly extending position in the cabinet in order to provide for release of the follower and its disengagement from the cabinet. With follower 54 in the forward position the closure may be moved on its hinged connection below a horizontal plane to provide access to the underside of the follower for operating latches 72.

When a tray is attached to the follower and supported in position with the follower projected in front of the cabinet as shown in Fig. 1, it is supported on the projecting end of closure 51 in a substantially horizontal position and at a height above the floor depending upon the height of a cabinet from the floor when mounted on a suitable table or the like. This position of a withdrawn tray provides for the convenient manipulation of the hinged card holders with cards 45 and top cover 46 so the records may be inspected and entries made thereon in the usual course of business.

It is desirable to provide means for actuating top cover 46 from an open position extending upwardly and rearwardly from the rear end of the tray over follower 60 to the closed position in the tray, as shown in Fig. 1, so that manual operation thereof is unnecessary when it is desired to return a withdrawn tray to its compartment in the cabinet. For this purpose a kicker bar 75 is slidably mounted for longitudinal movement along the top of follower 60, as shown in Fig. 1, for example, with a rear end extending to the rear of the follower and provided with a depending bracket carrying a pivoted dog 76 projecting rearwardly and normally having its ends slidable along the surface of bottom partition 14. A compression spring engages against the end of the bracket on the rear end of kicker bar 75 and is mounted on a pivoted rod 77 carried by said bracket and having its end slidable in a housing 78 on the under rear face of follower 60, as shown in Fig. 4.

Means, such as a head or washer, is provided on the end of rod 77 for limiting the movement of the rod through the housing thereby determining the rear limit of movement of kicker bar 75. The spring normally retains kicker bar 75 at its rear position. Dog 76 has the free end thereof arranged to engage the end of an actuating strip 79 mounted on bottom partition member 14 and positioned thereon to engage the end of dog 76 immediately after the rearward movement of the follower and a tray carried thereby from the position shown in Fig. 1 toward the cabinet is started. Upon engagement of dog 76 with the end of actuator strip 79, the kicker bar 75 will be held in position while the follower moves rearwardly toward the cabinet thereby projecting the forward end of the kicker bar outwardly in advance of follower 60 and into engagement with top cover 46 when it is positioned in an upwardly and rearwardly extending position from the tray for moving top cover 46 about its hinge into a forwardly extending housed position in the tray. When the compression on the spring for actuating kicker bar 75 has increased to a substantial extent and the bar has moved forwardly relative to follower 60 by reason of the rearward movement of follower 60, the friction of dog 76 on the end of strip 79 is overcome and the dog pivots on its supporting bracket disengaging strip 79 so that its end moves rearwardly with the follower and under the action of the spring kicker bar 75 is moved to its normal inoperative position on the follower. Actuator strip 79 is of sufficient length that the end of dog 76 rides thereon throughout the further rearward movement of follower 60 into its position against stops 70. Kicker bar 75 is, therefore, actuated only when the end of dog 76 engages the forward end of actuator strip 79 and then, only during a limited portion of the rearward movement of follower 60 into its compartment in the cabinet.

With this construction it will be seen that any tray in the cabinet can be supported at a constant posting level in the same horizontal position for reference to the records therein and posting upon the records in the manner above described and clearly shown in Fig. 1 without detaching the tray from the cabinet. The chains and their holders aid in guiding a tray in its movement up and down in the guideway in front of the housed trays between the lower position and its compartment in the cabinet. A tray may be supported at the bottom of the cabinet on the extended closure without withdrawing it forwardly with the follower. The records may be conveniently inspected in such a position, although the forwardly projected position of the follower provides for more convenient reference to the records, due to the fact that the top cover can be moved to a rearwardly extending position on top of the follower thereby allowing greater hinging movement of both the top cover and all of the records in the tray to the rear of the one that it is desired to examine or make entries upon.

In the form of the invention shown in Figs. 12 to 20 inclusive which will now be described, the cabinet construction is substantially the same as that previously described and the description will, therefore, be limited to the description of the structure that provides the necessary features for the construction and operation of the modified form. The cabinet includes an inner unit 80 and an outer casing 81 having side, top and rear walls, a front wall having an opening throughout the major portion thereof while the bottom of the outer casing is open in order that it may be slipped over the top of the inner unit into assembled position. The inner unit is constructed in a manner substantially similar to that previously described in which uprights are used at the front and back corners of the inner unit to which channel members are secured at opposite sides to provide for guiding the trays while partition members extend between opposite pairs of channel members to divide the inner unit into a plurality of tray receiving compartments with one tray received in each compartment.

Due to the close similarity of construction of the cabinet only the front portion is shown in the drawing. In the present form of construction, the front uprights at each side of the inner unit indicated at 82 are formed of sheet metal having a different cross-sectional configuration than the front uprights in the first form of the invention described. Uprights 82 are formed to provide inwardly projecting ribs 83 forming the guideways at the front of the cabinet extending up and down the front of the cabinet in inclined relation. The cabinet as disclosed in this form of construction has an inclined front inclining forwardly from the top toward the bottom so that the bottom projects forwardly of the top. Angle members 84 extend in horizontal relation one above the other at each side of the cabinet and are arranged in opposed relation to form guides for card index trays 85 to receive one tray on each pair of angle members 84. Partition members 86 extend transversely across the cabinet and are assembled with angle members 84 in alternate relation as clearly illustrated in the drawings, particularly in Fig. 13, to divide the inner unit into a plurality of tray compartments. These angle members 84 when assembled with the partitions, are spot-welded or otherwise secured to the front and rear uprights on the inner unit to form a rigid inner unit structure.

A top member 87 is applied to the top portion of the inner unit over the top pair of angle members 84, top partition 86 and suitably spot-welded to the upper ends of the front and rear uprights. The top member has laterally extending flanges around the edge portions, directed downwardly and secured to the uprights for the cabinet. The flange along the front portion of the top member is arranged to join the upper ends of the uprights over the upper ends of the guideways and provide a finished structure on the inner unit defining the front opening therein for the removal of the trays.

The bottom wall 88 for the cabinet is carried by the inner unit and has upturned flanges on the side and rear edges that fit inside the lower edges of the outer casing. Channel members are mounted on the bottom and extend between the uprights at the front and rear of the inner unit, the front channel member being shown at 89 in Fig. 12.

The lower front ends of the side walls of outer casing 81 are joined together by a strip 90 having a rearwardly extending flange as shown in Fig. 12 that rests on top of cross channel 89 when the outer casing is assembled on inner unit 80 so that it may be detachably secured to firmly attach the outer casing in assembled relation on the inner unit at the front. The rear of the outer casing is secured to the inner unit in the same manner as in the previous type of construction and the back of the cabinet is in a vertical plane as in the case of the previously described cabinet.

The closure 91 is hinged at 92 to an end section 93 at the lower end thereof. End section 93 is slidably mounted at the bottom of the cabinet in guide channels 94 secured to the uprights of the inner unit at the sides. Channels 94 are secured on top of bottom cross channels, 89 at the front and the corresponding rear cross channel, not shown, at the back of the cabinet. These guide channels 94 are located between the bottom cross channels and the lowermost angle members 84. A suitable key operated lock diagrammatically indicated at 95 is carried by the free end of closure 91 for cooperation with the front end of top section 87 on the inner unit to lock the closure in its closed position, as shown in Fig. 12, to close the opening in the front of the cabinet. The cover may be swung outwardly and downwardly upon release operation of lock 95 into a substantially horizontal position where it may be slidably moved with end section 93 in guide channels 94 at the bottom of the cabinet until the rear end of end section 93 engages stops near the rear portion of channels 94 and limits the inward movement of end section 93 and closure 91. This open position of the cover will have the free end extending a substantial distance forwardly of the cabinet to provide horizontal supporting means for a widthdrawn tray at the bottom portion of the cabinet.

Pivoted latches 96 mounted on end section 93 normally gravitate into a position wherein the forward ends are adapted to engage the rear portion of cross channel 89 and limit the forward movement of end section 93 in guides 94 to position the hinge connection 92 of closure 91 in the proper position for the closure to be swung into the closed position shown in Fig. 12. Apertures are provided in end section 93 over the opposite ends of latches 96 for insertion of an instrument through the openings to move the latches upwardly into inoperative position in removing the end section and the closure from the cabinet.

Slide members 97 of angle shape in cross-section are slidably mounted on the front ends of each tray guide member 84. A pair of lateral projections 98 extend through slots 99 in angle members 84. The rear ends of the projections on the outside of angle members 84 are turned upwardly to retain one portion of each slide member slidably engaged with the inner face of the vertically extending portions of angle members 84. The other portion of each slide member extends inwardly in parallel relation under partitions 86 in slightly spaced relation below the partitions, as clearly shown in Fig. 13.

The front ends of each angle member 84 terminate in equally spaced relation in the rear of guide ribs 83 at the front of the cabinet so as to define the rear portion of the guideway at each side of the cabinet. Track sections 100 are mounted in inclined transversely extending relation across the ends of slide members 97, one on each slide member, with the lower ends adapted to limit the rearward movement of each slide member through engagement with the forward end of members 84. This positions the track sections 100 on each of the slide members in aligned relation at each side of the cabinet and in spaced parallel relation with guide ribs 83 for cooperation therewith in guiding trays upon being withdrawn from a compartment in the cabinet up and down in attached relation on the cabinet at the front thereof.

Each tray 85 is provided with a front structure 101 formed with a handle 102, Fig. 14, in the central portion by which it may be manually engaged for withdrawal of the tray from the cabinet in the usual operation thereof. Label holders are provided at opposite sides of handle 102, and tray front 101 terminates in coincident relation with the bottom and sides of the tray body and extends above the side walls at the top thereof, to form a closure for the front end of the compartment in which the tray fits. All of the trays are of equal length and when housed in the cabinet in their respective compartments, fronts 101 are arranged in vertical alignment one above the other, as shown in Fig. 12 with the top and bottom edges of each tray front terminating in adjacent relation to the next one.

The upper side corners of each tray front are adapted to engage projections 103 on the upper inwardly extending portion of each slide member 97 as the trays are moved into their compartments in the cabinet for moving the respective slide members inwardly to their rearmost position with track sections 100 engaged with the forward ends of angle members 84.

A top cover 104 is hingedly mounted along the rear edge on rod 105 carried adjacent opposite ends by links 106 in turn pivotally mounted on shaft 107 mounted at its free ends in the rear ends of the side walls of the tray, as shown in Figs. 18 and 19. The upper edges of the side walls of the tray are cut away at the rear ends above the mounting for shaft 107 in order to accommodate rod 105 so that it may project beyond the opposite sides of the tray where it mounts rollers 108 in a position spaced outwardly at each side of the tray. The wire reinforcement mounted in the upper edge of the tray side walls is curved upwardly at 109 at the rear ends where it joins the laterally extending portion connecting the reinforcement at opposite sides of the tray, so as to avoid interference with operation of rod 105 as well as receiving and having the upturned rear flange on the tray bottom secured thereto. A sheet metal insert 110 is mounted in the rear end of the tray as shown in Fig. 19 with the central portion extending over shaft 107 and forms a back stop for the end card holder in the tray. Projections 111 are mounted on rod 105 against rotation inwardly of the side edges of the tray in a position to engage and provide stops for limiting the hinging movement upwardly and rearwardly of top cover 104.

Referring particularly to Figs. 17 and 19, top cover 104 upon being moved from its forwardly extending position in the tray upwardly on its hinge mounting on rod 105 will engage projections 111 when it reaches the position shown in Fig. 19. Further rearward movement of cover 104 will move projections 111 with the cover and cause links 106 to move about their pivots on shaft 107 until the top cover 104 reaches the rearwardly extending open position shown in Fig. 17. In this position links 106 are in their rearmost position at one limit of their pivotal movement. In Fig. 19 the parts are shown in the forwardly extended position. Projections 111 are extended upwardly and slightly forwardly so that should the cover in this position be manually released it would normally fall into its forwardly extending position on top of the rear card holder in the tray.

This top cover mounting construction provides for the automatic operation of the cover from the open to the closed position as a tray in withdrawn position from the cabinet is moved toward its housed position.

Slide members 97 are retained at their rear and forward limits of movement so as to insure uniform operation of the trays into and out of their compartment in the cabinet by means of leaf springs 112 carried by the inwardly projecting portions at the upper ends of the slide members. Springs 112 engage the under side portions of partitions 86 immediately above the respective slide members and the inwardly extending flanges of angle members 84 at the front bottom portion of the cabinet. These leaf springs are bowed so as to frictionally engage the bottom faces of partitions 86 or members 84 above and thereby frictionally retain each slide member in its adjusted position in the cabinet. Suitable projections formed on the inwardly extending portions of slide members 97 may be provided to engage and receive the ends of leaf springs 112 for retaining them in their proper operative position on the slide members.

Semi-cylindrical laterally projecting flanges 113 are provided on the rear ends of the side walls of each tray to lie in co-axial relation with the periphery of rollers 108 in the forwardly extending position of links 106, as shown in Fig. 19. These semi-cylindrical flanges prevent rollers 108 and links 106 from moving to the rear position in movement of a tray toward posting position. When a tray is returned from withdrawn position flanges 113 engage the lower ends of ribs 83 above cutout portions 114 and rollers 108 engage tracks 100 at the lower end of the guideways. The distance of ribs 83 from tracks 100 is such that rollers 108 and links 106 will be actuated from the rear position of Fig. 17 to the forward position of Fig. 19 by flanges 113 slidably engaging the inner edges of ribs 83 as the rear end of the tray is started upwardly in the guideways. This movement of links 106 to the forward position automatically moves top cover 104 to the forwardly extending position in the tray. Cut-out portions 114 provide space at the lower ends of guide ribs 83 to receive flanges 113 where links 106 and rollers 108 are moved to the rear position shown in Fig. 17.

When a tray is engaged in its compartment in the cabinet in the manner illustrated in Fig. 12, that is, in fully housed position, it may be removed for inspection of the records therein by manually pulling the tray forwardly out of its compartment. The side edges of the tray are slidably guided on the inwardly projecting portions of angle members 84 throughout the forward sliding movement of a tray from each compartment while rollers 108 are arranged adjacent vertically extending side portions of angles 84. When the rear end of a tray being withdrawn arrives at the front ends of angles 84, rollers 108 will then engage the rear faces of the track sections 100 and move slide members 97 forwardly until track sections 100 engage the rear edge of guide ribs 83, in the manner shown in Fig. 15. In this position rollers 108 will then be arranged in the channels at the sides of the cabinet so the rear end of the tray can be moved downwardly in the guideways at the rear of ribs 83 until they reach the lower end thereof when the tray will rest upon the open projecting closure 91 for support thereby in a substantially horizontal position, as shown in Fig. 15. The forward faces of track sections 100 on the slide members in the cabinet below the withdrawn tray will engage rollers 108 in the up and down movement of the tray in the front of the cabinet for cooperating with guide ribs 83 in guiding this up and down movement of the trays.

As the tray reaches a position in being withdrawn from its compartment in the cabinet so that rollers 108 engage guide ribs 83, the movement of the forward end of the tray manually into an inclined position, such as indicated in dot-and-dash lines in Fig. 15, will provide for more convenient movement of the tray up and down in the front of the cabinet since it prevents the rear end of the tray from dropping to the bottom of the guideways due to the inclination of the front of the cabinet. By this action the tray may then be allowed through manually moving the front downwardly to ride downwardly in the channels while being guided by guide ribs 83 and aligned track sections 100 to the bottom of these channels at the front of the cabinet in proper guided relation into the supported position shown in Fig. 15 on closure 91.

With the parts in this position, it will be seen that the forwardly projecting pair of slide members at the compartment from which the tray was withdrawn operate to block the channel, at the rear of guide ribs 83, so that rollers 108 on the withdrawn tray are limited in their movement upwardly between guide ribs 83 and track sections 100.

In the use of the tray, top cover 104 is moved to its rearwardly extending position on the tray. After use of the tray has been completed it is then desired to return it to its housed position in the cabinet. This operation is accomplished by pushing downwardly and rearwardly on the front end of the tray which tends to move the tray rearwardly as well as move the rear end upwardly with the front end of the extending closure acting as a fulcrum for this operation. As soon as the tray has reached the inclined position shown in dot-and-dash lines in Fig. 15, mere rearward pushing movement upon the front of the tray will cause rollers 108 to roll upwardly along the track sections 100 in the channels provided in the cabinet for guiding the rear end of the tray upwardly in the cabinet until it engages the end portions of the pair of slide members projected forwardly into engagement with guide ribs 83. When this position is reached, the continuity of track sections 100 is broken and the rollers may then immediately ride into the compartment, this action being assisted and guided by the inwardly extending flanges at the upper edges of the slide members.

The front end of the tray is then moved upwardly into the horizontal position level with the rear end and the tray is slidably moved into its compartment in the cabinet. When the tray front 101 reaches the forward end of the cabinet, it will move in through the opening until the upper side corners engage projections 103 on slide members 97 and upon the completion of the rearward movement of the tray into its compartment in the cabinet, the slide members will be moved into their rearward position with track sections 100 thereon in aligned relation with the other track sections of slide members 97.

At the beginning of the rearward and upward movement of a tray to move it from the extended position shown in Fig. 15 to the housed position in the cabinet, rollers 108 will be in the position shown in Fig. 17 at the beginning of this operation. As soon as the rollers 108 in this position engage the lowermost track section 100, the rearward movement of the tray will cause the rocking movement of links 106 about shaft 107 from the position shown in Fig. 17 to that shown in Fig. 19. This operation will move fingers 111 from the position shown in Fig. 17 to that shown in Fig. 19, will pick up the top cover and move it upon its hinge into its closed forwardly extending position within the tray. During the remainder of this movement of the rear end of the tray toward its closed position rollers 108, rod 105 and links 106 will remain in the position shown in Fig. 19.

Still another form of the invention is shown in Figs. 21 to 32 inclusive. The cabinet in this construction has an outer sheet metal casing provided with sides, top, bottom and rear walls. The cabinet is indicated by numeral 115 and has the front edges of the sides, top, and bottom walls provided with inwardly extending flanges 116 to form a front wall for the cabinet having rearwardly extending flanges at the inner edges thereof around the front opening in the front wall.

Front uprights 117 are mounted at opposite sides of the cabinet and secured to the side walls thereof by spot welding or the like in spaced parallel relation to front wall 116. These uprights are channel shape in cross-section, have the central portion offset inwardly from the side wall of the cabinet and are formed with a plurality of struck-out laterally extending ears 118 arranged in spaced parallel horizontally extending relation. Ears 118 extend inwardly from each upright at each side of the cabinet.

Rear uprights 119 are illustrated in Fig. 30 and in dotted lines in Fig. 21. Rear uprights 119 are secured by spot welding or the like to the inner faces of the side walls of the cabinet toward the rear end portion thereof but extend in inclined or diagonal relation on the side walls with the bottom ends positioned nearer to the front of the cabinet than the top end in the manner indicated in Fig. 21. Rear uprights 119 are formed with a plurality of struck-out laterally extending ears 120 that are arranged in horizontal aligned relation with ears 118 in order to cooperate therewith to form guides for slide members 121.

Slide members 121 are formed of sheet metal, having side channel portions 122 arranged adjacent the inside walls of cabinet 115. Side channel portions 122 are slidably supported on ears 118 and 120 and are held in rigid connected relation by sheet metal partition 123 secured at its side edges to the top inwardly extending flanges of channels 122. These slide members 121 are provided with a rear wall 124 secured at its edges and ends to partition 123 and channels 122. Each slide member 121 provides an individual tray compartment for receiving and housing a tray therein in the cabinet. The card index trays used in this form of the invention are identical with trays 85, in view of which corresponding numerals used in Figs. 12 to 19 will be used for the corresponding parts of the trays illustrated in Figs. 21 to 32. The sides of a tray 85 engage and rest on the inner edges of the lower flanges of side channels 122 in the housed position of a card index tray in a slide member 121.

In the housed position of a tray 85 in slide member 121, the rear end is in close adjacent relation to rear wall 124 in which position the portion of the rear end of the tray bottom, engaged around reinforcing wire 109 where it extends across the back of the tray, engages the inclined face of cam projection 125 carried by pivoted latch 126, Fig. 26, pivotally mounted at 127 on a stud carried by the center portion of rear wall 124. The opposite end of latch 126 terminates in the rear end of one of the channel members 122 at one side of slide member 121 and has a projection 128 on the lower free end adapted to extend through an opening at the rear end of channel member 122 adjacent one end of rear wall 124 for engagement in a slot 129 formed in inwardly projecting ears 120 on rear uprights 119. The engagement of the rear end of the tray with cam 125 raises latch 126 to disengage projection 128 from slot 129 and in this disengaged position tray 85 can be operated to move slide member 121 back and forth therewith.

Projection 128 has a beveled lower end for engaging the rear edge of an ear 120 on forward movement of slide member 121 for securing an operation hereinafter described. The front end of the upper flange of each channel member 122 is formed with a curved projection 130, Figs. 21 and 30.

An inner top member 131 extends between the upper ends of uprights 117 and 119 at the extreme top of the cabinet and is mounted in spaced parallel relation to the top wall by edge flanges extending upwardly to engage the top wall.

Channel members 132 and 133 are secured to the cabinet bottom wall, extend between and have the lower ends of the front and rear uprights respectively, secured thereto at the bottom of the cabinet.

A spring 134 carried by latch member 126 is normally operative to engage bracket 135 carried at the rear end of each slide member 121 for normally moving latch member 126 downwardly so that projection 128 will engage in slots 129 in inwardly projecting ears 120 for retaining the slide member latched in a position projecting forwardly from its normal housed position in the cabinet.

A closure 140 is provided for the cabinet and is mounted for hinging movement about the rolled front edge of the top partition 141 arranged in spaced relation at the top of the cabinet below inside top member 131. This rolled front edge is indicated at 142 in Fig. 24 and is arranged to cooperate with the inwardly curved upper end 143 of cover 140 to provide a hinging action for the cover and for retaining the upper end in position to close the front opening in the cabinet. The lower end of cover 140 carries a suitable key operated lock shown diagrammatically at 144 in Fig. 24, for locking the closure in the closed position to prevent access to the trays.

The cover is moved to open position by unlocking lock 144 and moving the lower end of the cover upwardly until it is in a horizontal position with the upper end of the cover whereupon the cover may be slidably moved into the compartment between upper partition 141 and inner top member 131.

A pair of inwardly facing guide channels 145 is mounted at opposite sides of the cabinet at the bottom thereof on top of cross channels 132 and 133 for slidably receiving sheet metal supporting panel 146.

Guideways 147 are provided at opposite sides of the cabinet and have the upper ends pivotally secured to one end of links 148. The opposite ends of links 148 are pivotally secured to studs 149 carried by channel sections 150 mounted between front uprights 117 and front wall 116 of the cabinet at the upper ends thereof, as shown more clearly in Fig. 21. Each channel member 150 is formed with slot 151 for receiving a laterally projecting pin 152 carried by the lower end of each link 148 to project through slot 151 for engagement with the upper free ends of leaf springs 153 having the opposite ends mounted on the front uprights. Springs 153 normally tend to move links 148 about pivot studs 149 so that the upper ends carrying guideways 147 will be moved toward the cabinet for normally tending to move the guideways into the open front of the cabinet for housing therein in the position shown in Fig. 24. In the housed position guideways 147 are inoperative.

The lower end of each guideway has one end of a link 154 pivotally connected thereto, there being two links used, one for each guideway. Each link is housed and guided at one side edge of panel 146. For the purpose of housing and guiding each link 154 in panel 146, the edges of the sheet metal forming panel 146 are turned downwardly at the sides to provide outer side walls 155. Angle members 156 are secured to the under face of panel 146 in inwardly spaced parallel relation to side walls 155 to accommodate links 154 between the angle members and the side walls at each side of panel 146. Angle members 156 have lateral and outwardly extending flanges 157 along the lower edges thereof at the forward end of panel 146, as shown in Fig. 29. Side walls 155 are omitted throughout this forward portion of the panel to provide open sides at the front of panel 146 slidably receiving and supporting links 154 throughout the forward portion.

It will be noted that angle members 156 and outer side walls 155 to the rear of bottom flanges 157 provide an open slot at the bottom to allow the rear ends of links 154 to drop downwardly about their pivotal mounting on the lower ends of guideways 147. The rear ends of links 154 are provided with depending hook portions 158 on the free ends adapted to engage in openings 159 in channels 145 for limiting the outward movement of the links beyond the front of cabinet 115 and also for limiting the outward sliding movement of panel 146 when manually pulled outwardly by reason of the front edges of side flanges 155 engaging with the pivotal connection of links 154 on the lower ends of guides 147. When panel 146 is moved inwardly into the cabinet, the open sides of the panel at the forward portions allow the pivot portions between guides 147 and links 154 to slide forwardly to the front portion of the panel. When panel 146 is moved rearwardly, the rear hooked ends of links 154 will be raised to disengage from openings 159 in channels 145 by the inclined rear ends to release links 154 from the latched position. Rearward movement of panel 146 provides for the movement of guideways 147 toward the front of the cabinet into the housed position in the cabinet by relative movement of the lower ends of the guideways and links 154 to the front portion of the panel until the pivotal connection of the links on guideways 147 is engaged with the front of the panel. Inward movement of the panel carries the links and guideways inwardly into the front of the cabinet into vertical relation with the inner edges engaged against the front edge of the channel portion of front uprights 117. In this position, the cover can be moved into its closed position as shown in Fig. 24.

When supporting panel 146 is pulled outwardly from the bottom of the cabinet, it will move guides 147 outwardly to the position shown in Fig. 21 after relative movement of the lower ends of the guides in the open side portions of the panel from the front to the central portion where this movement is stopped by the front ends of side walls 155. Panel 146 retains guides 147 in an inclined position with the top ends nearer the front of the cabinet than the bottom ends. In this outer position of guides 147, the trays may be moved out of their compartments in the cabinet to the bottom of the guides for inspection and posting of records in the tray while being supported on panel 146.

A spring pressed latch 160 is pivotally mounted at 161 in the central portion on the under side of panel 146 and has a shoulder at 162 on the rear end thereof adapted to drop down in front of the lower front portion of the cabinet, as shown in Figs. 21 and 32, for retaining panel 146 in its extended position. A leaf spring 163 is mounted on the underside of panel 146 at the rear end and has the forward end engaged with the rear end of latch 160 for normally moving it downwardly into latching position. Panel 146 has an opening 164 so that the forward end 165 of latch 160 may be manually engaged to lift the rear end of the latch for disengaging shoulder 162 from the front end of the cabinet when it is desired to move panel 146 into housed position in the cabinet.

A pair of reinforcing channels 166 is mounted in spaced parallel relation on the under face of supporting panel 146 in order to give it sufficient strength to support the weight of a withdrawn tray and for cooperating in guiding supporting panel 146 back and forth into and out of the housed position in the cabinet.

A flexible strip 167 is mounted on the front depending flange formed on supporting panel 146, as shown in Fig. 29, and has tension coil springs 168 anchored at one end to the under face of supporting panel 146 and at the opposite ends to the free ends of flexible strip 167 for normally holding the free ends of flexible strip 167 in a rearwardly flexed position. The free ends of flexible strip portions 167 at opposite sides of panel 146 are adapted to engage the front ends of links 154 when panel 146 is pushed into its housed position in the cabinet so as to flex the ends of strip 167 against the tension of springs 168 into a position where the free ends lie adjacent the depending front edge on panel 146. This obtains the forward projection of panel 146 so that the forward end normally projects slightly in advance of the front of the cabinet in order to make it convenient for manually gripping the front end of panel 146 when it is desired to pull it out into its extended position, as shown in Fig. 21. As soon as the cover is unlocked, the operation of flexible strip 167 will move the cover as well as panel 146 outwardly from the open end of the cabinet so the cover can be readily gripped for movement into its housed position in the compartment at the top of the cabinet.

Each guideway 147 is of duplicate construction, but the parts are formed in opposite relation to one another for cooperation at opposite sides of the cabinet to guide the rear end of each tray up and down in front of the cabinet. For this purpose each guideway comprises an outer elongated case section 170 and an inner case section 171, each formed of sheet metal having a channel shape in cross-section as illustrated in Fig. 22. Outer case section 170 has a laterally extending wide flange 172 on the front edge thereof and a narrow flange 173 extending laterally from the rear edge in parallel relation to front flange 172. Inner case section 171 has a front flange 174 overlapping flange 172 and suitably united therewith with a narrow inner side section 175 spaced from the free edge of flange 172 as shown in Fig. 22 to provide a seat. The rear edge of inner wall 175 of inner case section 171 extends outwardly toward outer section 170 to provide a wall 176 extending in spaced parallel relation to flange 172. This wall 176 terminates in spaced relation to outer side section 170 in a parallel intermediate wall portion 177. Intermediate wall portion 177 extends into the plane of narrow flange 173 where it is turned laterally at 178 in the same direction as 173 having the free edge terminating in a forwardly projecting portion 179. Forwardly projecting portion 179, flange 178 and the adjacent portion of intermediate wall 177 are cut away at a plurality of portions throughout the length thereof having a size for receiving the front ends of slide members 121 when the guideways are in the inclined position shown in Fig. 21. A portion of intermediate wall 177 in each of the cut-out portions is extended laterally toward outer casing member 170 as indicated at 180.

A plurality of track sections 181 are provided one for each cut-out section in each guideway 147. Each track section 181 is formed of sheet metal having a shape in cross-section substantially the same as inner case member 171. Track section 181 has a track portion 182 and a lip 183 on the free end thereof carried by intermediate section 184 formed with a central opening to receive projection 180. Central section 184 will lie on the outside face of intermediate wall portion 177 with track portion 182 and lip 183 in coincident aligned relation with flanges 178 and 179 of inner case section 171, so as to fill the opening in said inner case section and provide a continuous track. To support track section 181 in this position, the opposite end of intermediate wall 184 is provided with a lateral flange 185 terminating in a pivot projection 186 engaging in the seat formed between inner wall 175 and the end of flange 172, as shown in Fig. 22. A projection 187 is provided on intermediate wall 184 and tension spring 188 connects projections 187 and 180 for normally moving track section 181 about pivot projection 186 into a position where track portion 182 is in coincident aligned relation with flange 178. This provides a structure wherein the track sections will form a continuous closed track structure on the rear face of each guideway 147.

When the guideway is supported in the inclined position, shown in Fig. 21, in advance of the cabinet, the cut-out sections in inner case member 171 are aligned one with each slide member 121.

When it is desired to remove a tray from its compartment in the cabinet for inspection, the handle 102 on tray front 101 is manually engaged and the tray withdrawn by forward movement from its compartment in the cabinet. Slide member 121 of a selected tray moves forwardly with the tray through cam projection 125 engaging the rear end of the tray. Projection 130 is provided with an angular face 189 arranged to engage the inner edges of track sections 181 for moving the engaged track sections outwardly about the pivot projections 186 to the position shown in Fig. 22 providing for the entrance of projections 130 through the openings in inner case section 171 when the slide member reaches the outer limit of movement. Projections 130 will extend into the longitudinally extending channel in guideways 147 until the ends engage flanges 176 of inner case sections 171. This will arrest the forward movement of slide member 121 in withdrawing the tray from the cabinet. The forward ends of projections 130 and channels 122 will provide guideways communicating with the channels in guideways 147 for guiding the tray being pulled forwardly from the cabinet from the slide member into guideways 147.

When slide member 121 reaches this forward position, the tray then begins to move forwardly in the slide member and relative thereto causing the rear end of the tray to be pulled out from under operating projection 125 on latch 126. Spring 134 then moves latch 126 downwardly to engage projection 128 in slot 129 formed in ears 120. This locks the slide member in this forwardly projecting position with the forward ends in engagement with guide members 147.

The forward movement of the tray from the slide member is then continued until rollers 108 on the rear end thereof reach the forward end of channels 122 whereupon the rollers will engage walls 176 of inner case member 171 and be received in the channels formed within guides 147 for rolling movement along walls 176 up and down in guide members 147. The remaining track sections 181 are in their normal positions in which track portions 182 are in coincident relation with flange 178 thereby providing closed guideways for rollers 108 on the rear end of the withdrawn tray so that they may travel up and down in guideways 147 without becoming detached therefrom.

After a tray has been withdrawn so that rollers 108 on the rear end thereof engage in guideways 147 the front end may be manually lowered below the rear end to some extent so that rollers 108 will travel downwardly in guideways 147 with the downward movement of the front end of the tray into the position shown in Fig. 21 where the tray is supported upon supporting panel 146 in forwardly projecting position in front of the cabinet while still connected to guides 147. In this position the top cover may be moved rearwardly to the position shown for inspection of the records in the tray and the making of entries therein in the usual course of business, as well known in the art.

To return a withdrawn tray from the position shown in Fig. 21 where it is supported on panel 146, the front end is manually engaged and pushed rearwardly and at the same time slightly downwardly to first cause rollers 108 to engage the track portions 182 and flanges 178. This operation first causes the actuation of the top cover from the open to the closed position extending forwardly in the tray. This operation is assisted by the outwardly projecting flange portions 190 at the lower ends of guides 147 engaging arcuate projections 113 on the sides of tray 85 so as to cause movement of the tray rearwardly in addition to its rearward manual pushing and thereby cam rollers 108 toward projections 113 in securing movement of the top cover into the closed forwardly extending position in the tray as heretofore described. The outwardly flared portions 190 at the lower ends of the guides also provide a convenient space for the rearward movement of rollers 108 and the associated structure when the top cover is moved to the open position.

Upon this initial rearward and downward pushing movement on the front end of the tray and the completion of the closing movement of the top cover, the rollers 108 then ride up guideways 147 and when the tray has reached a position wherein the rear end is higher than the front end, such as that heretofore described in connection with the disclosure in Fig. 15, further pushing movement of the tray rearwardly together with a lifting of the front end thereof will cause rollers 108 in the rear end of the tray to roll upwardly in guideways 147 until rollers 108 engage projections 130 on the projected slide member 121. This will cause rollers 108 to move into channels 122 of the projected slide member 121 for guiding the rear end of the tray so that it will ride in channels 122. Slide member 121 will remain latched in its forwardly projecting position during further rearward movement of the tray therein. When the tray has been moved inwardly into the outwardly projected slide member 121 to a point where the rear end engages projection 125 on latch 126, latch 126 will then be raised up to disengage projection 128 from slot 129. This will then release slide member 121 from its latched projected position and allow the slide member to move with the tray in further rearward movement into the housed position of the tray and slide member in the cabinet where the rear end of the slide member engages the back wall of the cabinet.

After this movement is completed in connection with the withdrawal and return of any tray to its slide member and compartment in the cabinet, the cabinet may be closed to prevent access to the trays by sliding panel 146 into its compartment in the cabinet. While latch 160 is held in release position, panel 146 may then be moved rearwardly and the manual operation of the latch released for the complete movement of panel 146 into its housed position in the cabinet. In this operation the front wall of the panel will move inwardly into engagemtnt with the lower ends of guides 147 and the pivot connection thereof to links 154 and cause the inclined rear edge of the links to disengage hooks 158 from notches 159 thereby moving guides 147 inwardly with panel 146.

Continued movement of supporting panel 146 into its housed position in the cabinet secures completion of inward movement of guides 147 into a vertical position housed within the front of the cabinet wherein the rear edges thereof engage the channel portions of front uprights 117. In this position, guides 147 are inoperative and are housed within the front of the cabinet so that closure 140 may then be slidably moved out of its compartment and swung into the closed position, as shown in Fig. 24.

It will be noted that in each form of construction heretofore described and shown in the drawings, a number of features of construction and operation are common to each form. Any tray can be withdrawn from its compartment and moved into a horizontal forwardly projecting position in front of the cabinet for inspection of the records therein and mechanism is provided for guiding the tray in this operation without allowing its complete detachment from the cabinet. By convenient manual operation the tray may be returned and is guided by this mechanism into its original position in the cabinet. This mechanism provides guideways for the movement of any tray up and down between top and bottom portions of the cabinet in advance of the remaining trays. The mechanism also provides a means to limit the movement of a withdrawn tray up and down in front of the cabinet between the supported position where the records may be inspected and used in the usual manner and the position from which the tray was withdrawn so that upon the return movement the tray is automatically guided into the compartment in the cabinet from which it was originally withdrawn. The closure for the cabinet also provides a supporting means for the trays in the position where they are supported for inspection and suitable means automatically actuates the top covers on the trays to move them from the open to the closed position when a withdrawn tray is returned to its compartment in the cabinet.

In each form of construction any tray may be conveniently moved to a single uniform supported position regardless of its position between the top and bottom of the cabinet, so that the operator may withdraw any tray from any level in the cabinet between the top and bottom thereof and position it at one point for inspection and use of the records in the tray.

The invention claimed is:

1. A card index file, comprising a cabinet having an open front, a series of card index trays slidably mounted in said cabinet in adjacent substantially horizontal position one above another for withdrawal through said opening, guide and retaining means at the front of said cabinet extending from the top to the bottom portions thereof, cooperating means on each tray for engaging said guide means when a tray is withdrawn from said cabinet to retain the tray against complete detachment from said cabinet and for guiding said tray in withdrawn position up and down in said means in front of the remaining trays in said cabinet, means associated with each tray communicating with said guide means having parts operated in tray withdrawal cooperating with said guide and retaining means for limiting movement of the tray in said guide and retaining means and for arresting the withdrawn tray opposite the position in the cabinet from which it was withdrawn, supporting means mounted on said cabinet communicating with said guide and retaining means for receiving and supporting a withdrawn tray in projecting relation beyond the front of said cabinet for use and reference to the index therein, said supporting means supporting any of the trays in said cabinet in the same position for use, and said guide means further preventing withdrawal of a second tray to a position wherein it could be inserted in the position in the cabinet normally occupied by the first withdrawn tray.

2. A card index file, of the character claimed in claim 1, said index trays normally having the front ends thereof lying in a substantially vertical plane in the housed position thereof in said cabinet, said guide means comprising inclined guideways at the front of said cabinet inclining from the top thereof downwardly and forwardly, said tray supporting means at the bottom of said inclined guideways, and said cooperating means on the rear ends of each tray, said inclined guideways coacting with said cooperating means on said trays to elevate said trays in said guideways upon rearward pushing movement upon the trays.

3. A card index file, of the character claimed in claim 1, said index trays normally having the front ends thereof lying in a substantially vertical plane in the housed position thereof in said cabinet, said guide means comprising inclined guideways at the front of said cabinet inclining from the top thereof downwardly and forwardly, said tray supporting means at the bottom of said inclined guideways, and said cooperating means on the rear ends of each tray, said inclined guideways coacting with said cooperating means on said trays to elevate said trays in said guideways upon rearward pushing movement upon the trays, and means actuated by the trays in withdrawal from said cabinet for obstructing said guideways at the point from which a tray is withdrawn whereby upon rearward movement of a withdrawn tray in said guideways said means will cause said tray to be guided into the portion of said cabinet from which it was withdrawn.

4. A card index file, comprising a cabinet having an open front, a series of card index trays slidably mounted in said cabinet in substantially horizontal position one above another for withdrawal through said opening, guide and retaining means at the front of said cabinet extending from the top to the bottom portions thereof, cooperating means on the rear end of each tray for engaging in said guide means when a tray is withdrawn from said cabinet for retaining the tray against complete detachment from said cabinet and for guiding a withdrawn tray in movement upwardly and downwardly in said guide means between the top and bottom thereof, supporting means at the bottom of said guide means projecting beyond the front of said cabinet and adapted to receive a withdrawn tray at the bottom of said guide means for support thereof for use of said tray for reference to the index therein, and means associated with each tray automatically operable by a withdrawn tray for restricting travel of said tray in said guide means to and from said supporting means and for preventing withdrawal and movement of a second tray to the position in the cabinet normally occupied by said first tray, said trays being only manually operable between withdrawn position at one end of said guide and retaining means and housed position in one compartment in said cabinet.

5. A card index file, comprising a cabinet having an open front, means dividing said cabinet into a plurality of sections each adapted to slidably receive a tray therein, said trays being arranged in substantially horizontal position one above another, guide and retaining means at the front of said cabinet extending from the top to the bottom portion thereof in advance of said first-mentioned means and formed to communicate with said first-mentioned means and cooperate therewith in guiding a tray in said cabinet, cooperating means at the rear end of each tray having guiding engagement with said first-mentioned means and said guide and retaining means in the withdrawal of a tray from said cabinet to retain the withdrawn tray against complete detachment from said cabinet and for guiding said tray in said guide means in movement upwardly and downwardly in the front of said cabinet and in advance of the remaining trays therein, and a supporting panel slidable in said cabinet below the trays therein and operable to project beyond the front of said cabinet for supporting a card index tray in withdrawn position on top thereof for reference and normal use of the index cards therein, and means actuated by said tray for restricting travel of a withdrawn tray in said guide means to and from said supporting panel and for preventing withdrawal and movement of a second tray in said guide means past the vacant section normally occupied by said first withdrawn tray, said restricting means being displaceable to its initial position upon the reinsertion of said first tray in its section.

6. A card index file, comprising a cabinet having an open front, a series of card index trays slidably mounted in said cabinet in substantially horizontal position one above another for withdrawal through said opening, guide and retaining means at the front of said cabinet extending from the top to the bottom portion thereof, cooperating means on each tray for engaging said guide means when a tray is withdrawn from said cabinet to retain the tray against complete detachment from said cabinet and for guiding each tray in movement upwardly and downwardly in said guide means, supporting means operable to project outwardly in front of said cabinet for supporting a withdrawn tray in outwardly extending relation in front of said cabinet for use and reference to the index therein, said index trays being manually operable for movement from the housed position in said cabinet into a supported position on said supporting means, and means associated with and actuable by each tray cooperating to assist manual operation of said trays for returning them from a common position supported upon said supporting means into their respective housed positions in said cabinet and for preventing the reinsertion of a tray in any position other than the position from which said tray was withdrawn.

7. A card index file, comprising a cabinet having an open front, a series of card index trays slidably mounted in said cabinet in substantially horizontal position one above another for withdrawal through said open front, guide and retaining means at the front of said cabinet extending from the top to the bottom portion thereof, cooperating means on each tray for engaging said guide means when a tray is withdrawn from said cabinet to retain the tray against complete detachment from said cabinet and for guiding each tray up and down the front of said cabinet, supporting means carried by said cabinet for supporting a withdrawn tray in substantially horizontal position for use, a follower slidable adjacent said supporting means in said cabinet and having portions aligned with said guide means in the inner position of said follower and said cabinet for receiving the cooperating means on a withdrawn tray at one end of its movement in said guide means for slidable movement of said withdrawn tray and follower forwardly beyond the front of said cabinet while being supported by said supporting means, a top cover pivoted in the rear end of each tray, and means carried by said follower and cabinet operable for moving said top cover to a closed position upon movement of said follower and withdrawn tray carried thereby toward said cabinet from the extended position in front of said cabinet.

8. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet, lineally movable members in said guideways having a plurality of holders for said trays, and cooperating means on each tray for engaging in said holders in the withdrawal position of a tray, said members and means cooperating to normally prevent complete detachment of said trays from said cabinet in withdrawal position and providing for movement of a withdrawn tray up and down in said guideways with said members whereby each of said trays may be moved to a desired position relative to said cabinet when withdrawn therefrom for reference to and use of the cards therein.

9. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet, lineally movable members in said guideways having a plurality of holders for said trays, means for limiting the movement of each of said members for positioning each holder thereon in alignment with one of said trays while providing for movement of said members from said position toward one end of said guideways, and cooperating means on each tray for engaging in said holders in the withdrawn position of a tray, said members and the last-mentioned means cooperating to normally prevent complete detachment of said trays from said cabinet in withdrawn position and providing for movement of a withdrawn tray from a position opposite that in which it is housed in the cabinet up and down in said guideways toward and from one end thereof whereby each of said trays may be moved to a desired position relative to said cabinet when withdrawn therefrom for reference to and use of the cards therein, said first-mentioned means arresting the return movement of a withdrawn tray opposite its position in the cabinet so it may be readily slid into housed position in said cabinet.

10. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet, lineally movable members in said guideways having a plurality of holders for said trays, means for normally retaining said lineally movable members in position in said guideway wherein each holder is aligned with one of said trays in said cabinet and providing for lineal movement of said holders in one direction toward one end of said guideways, and cooperating means on each tray for engaging in the holders aligned therewith upon withdrawal from said cabinet for movement with said members up and down in said guideways to a position wherein said withdrawn tray is supported for inspection and use of the records therein, said first-mentioned means and said holders cooperating to align the tray with its position in the cabinet upon return of the tray to its original position in the cabinet.

11. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet, lineally movable members in said guideways having a plurality of holders for said trays, means for normally retaining said lineally moveable members in position in said guideway wherein each holder is aligned with one of said trays in said cabinet and providing for lineal movement of said members in one direction toward one end of said guideways, cooperating means on each tray for engaging in the holders aligned therewith upon withdrawal from said cabinet for movement with said members up and down in said guideways to a position wherein said withdrawn tray is supported for inspection and use of the records therein, said first-mentioned means and said holders cooperating to align the tray with its position in the cabinet upon return of the tray to its original position in the cabinet, and means for retaining said lineally movable members in position with said withdrawn tray in the position and during the inspection of the records therein.

12. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet, lineally movable members in said guideways having a plurality of holders for said trays, means for normally retaining said lineally movable members in position in said guideways wherein each holder is aligned with one of said trays in said cabinet and providing for lineal movement of said members in one direction toward one end of said guideways, cooperating means on each tray for engaging in the holders aligned therewith upon withdrawal from said cabinet for movement with said members up and down in said guideways to a position wherein said withdrawn tray is supported for inspection and use of the records therein, said first-mentioned means and said holders cooperating to align the tray with its position in the cabinet upon return of the tray to its original position in the cabinet, and a follower slidably mounted in said cabinet having portions aligned with said holders formed to receive cooperating means on a withdrawn tray for interconnection of said withdrawn tray therewith whereby said tray may be moved to a further extent outwardly beyond said cabinet with said follower projecting outwardly from the front of said cabinet for the inspection and use of the records in said withdrawn tray while said follower maintains said tray normally against detachment from said cabinet, and means on said follower for retaining said lineally movable members against movement in said guideways while a withdrawn tray is engaged therewith.

13. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet, lineally movable members in said guideways having a plurality of holders for said trays, means for normally retaining said lineally movable members in position in said guideways wherein each holder is aligned with one of said trays in said cabinet and providing for lineal movement of said members in one direction toward one end of said guideways, cooperating means on each tray for engaging in the holders aligned therewith upon withdrawal from said cabinet for movement with said members up and down in said guideways to a position wherein said withdrawn tray is supported for inspection and use of the records therein, said first-mentioned means and said holders cooperating to align the tray with its position in the cabinet upon return of the tray to its original position in the cabinet, and a follower slidably mounted in said cabinet having portions aligned with said members formed to receive cooperating means on a withdrawn tray for interconnection of said withdrawn tray therewith whereby said tray may be moved to a further extent outwardly beyond said cabinet with said follower projecting outwardly from the front of said cabinet for the inspection and use of the records in said withdrawn tray while said follower maintains said tray normally against detachment from said cabinet, and means on said follower for retaining said lineally movable members against movement in said guideways while a withdrawn tray is engaged therewith, and supporting means mounted in said cabinet and projectable into a forwardly extending position for supporting a withdrawn tray in substantially horizontal position for use and reference of the records therein.

14. A card index file, comprising a cabinet having an open front, a series of card index trays slidably mounted in said cabinet in substantially horizontal position one above another for withdrawal through said open front, guideways at the front of said cabinet on each side of said trays extending in upright relation from the top to the bottom portions of said cabinet, a pair of endless members mounted in the sides of said cabinet at each side of said trays and having sections lineally movable in said guideways, holders mounted on said endless members aligned one with each tray in said cabinet and adapted to receive its respective tray, means for causing said endless members to be operated in unison, means for limiting movement of said endless members in one direction wherein said holders are aligned with said trays, cooperating means on the rear end of each tray for engaging in the holders in said endless members aligned therewith to retain said tray against complete detachment from said cabinet in withdrawn position, said withdrawn tray being movable with said holders and endless member downwardly in said guideways to the lower ends thereof, and means for supporting said tray in substantially horizontal position at the lower ends of said guideways for reference to and use of the records therein.

15. A card index file, comprising a cabinet having an open front, a series of card index trays slidably mounted in said cabinet in substantially horizontal position one above another for withdrawal through said open front, guideways at the front of said cabinet on opposite sides of said trays in advance of the front ends of said trays and extending in upright relation from the top to the bottom portions of said cabinet, endless members mounted in said cabinet at opposite sides of said trays having sections thereof lineally movable in said guideways, holders on said endless members normally retained in opposed relation to each other and in aligned relation with the trays in said cabinet, means normally operating said endless members in one direction in said cabinet to a normal position of rest with said holders aligned with said trays, cooperating means on each tray for engaging in the aligned holders on said endless members when withdrawn from said cabinet whereby said means and holders cooperate to retain a withdrawn tray against complete detachment from said cabinet, said withdrawn tray being movable from its withdrawn position from said cabinet downwardly to the lower ends of said guideways with a corresponding movement of said endless members, and means for supporting said withdrawn tray in said lowered position against detachment from said cabinet for use and reference to the records housed therein.

16. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions of said cabinet and arranged at the sides of said trays, endless members at the sides of said cabinet and said trays mounted in said cabinet for lineal travel with sections lineally movable in said guideways, a plurality of holders mounted in abutting relation along each section of said endless member in said guideways corresponding in number to the number of trays in said cabinet, the holders on one endless member being opposed to the holders on the other member and said holders being arranged to cooperate in pairs with the opposite sides of each tray, means for normally operating said endless members into a position where said holders are arranged in said guideways and in alignment with said trays so as to selectively receive any one of said trays therein, means gearing said endless members together for simultaneous movement, cooperating means on the rear end of each tray for engaging in the pair of holders aligned with said tray upon withdrawal of the tray from the cabinet for retaining said tray against complete detachment from said cabinet in withdrawn position and providing for movement of a withdrawn tray from its normal position in the cabinet to the lower portion of said guideways, supporting means slidable in and out of said cabinet at the lower end thereof operable to project outwardly in front of the cabinet in one position for supporting a withdrawn tray at the lower ends of said guideways thereon in substantially horizontal position for reference to the records carried thereby, and means actuated during the support of said withdrawn tray on said supporting means for holding said endless members against movement.

17. A card index file, comprising a cabinet having an open front, a series of card index trays slidably mounted in said cabinet one above another for withdrawal through said open front, guideways at the front of said cabinet in advance of the front ends of said trays and at the sides thereof extending from the top to the bottom portions of said cabinet, a pair of endless members at opposite sides of said trays mounted for lineal movement in said cabinet with sections lineally movable in said guideways, means on each of said endless members formed for cooperation with parts on the rear ends of said trays and said guideways for retaining a withdrawn tray against complete detachment from the cabinet and providing for up and down movement of a withdrawn tray in said guideways, supporting means at the lower ends of said guideways in said cabinet slidable into and out of the cabinet for positioning in outward projecting relation in front of the cabinet to receive and support a withdrawn tray thereon for reference and use of the records carried thereby, and a follower slidably mounted on the portion of said cabinet above said supporting means formed for cooperation with the parts on a withdrawn tray to detachably connect said tray thereto for further withdrawal from said cabinet in the supported position of said withdrawn tray on said supporting means.

18. A card index file, comprising a cabinet having an open front, a series of card index trays slidably mounted in said cabinet one above another for withdrawal through said open front, guideways at the opposite sides of said cabinet and at the front thereof in advance of the front ends of said trays extending from the top to the bottom portions of said cabinet, endless members mounted for lineal movement in opposite sides of said cabinet having sections lineally movable in said guideways, means on said endless members for engaging coacting parts on each tray in combination with said guideways for retaining each tray against complete detachment from said cabinet when withdrawn through said open front and supporting a withdrawn tray for movement up and down in said guideways, and a cover member slidably mounted in the bottom portion of said cabinet for support in an outwardly extending substantially horizontal position in front of said cabinet in the open position thereof for supporting a withdrawn tray at the lower ends of said guideways for reference and use of the records housed therein, said cover being adapted to be withdrawn from said compartment and moved into an upright position in front of said cabinet for fitting within the front opening of said cabinet in order to close said front opening and prevent access to the trays therein.

19. A card index file, comprising a cabinet having an open front, a series of card index trays slidably mounted in said cabinet one above another for withdrawal through said open front, guideways at the front of said cabinet in advance of and at the sides of the front ends of said trays extending from the top to the bottom portions of said cabinet, endless members mounted in the sides of said cabinet at opposite sides of said trays for lineal movement therein having one section of each member lineally movable in said guideways and having another section of said members movable in a plane inclined to the horizontal, inclined runways mounted in the sides of said cabinet parallel with the inclined sections of said endless members, weights attached to the inclined sections of said endless members in the sides of said cabinet and slidable on said runways normally adapted to operate said endless members into a position where said weights are at the lower ends of said runways, a plurality of holders mounted on said endless members on the sections thereof normally engaged in said guideways and arranged to provide holders on each endless member aligned with each tray and said cabinet in the normal position thereof, cooperating means on the rear ends of each tray for engaging in said holders in the withdrawn position of a tray for cooperation with said holders and guideways to retain a withdrawn tray against complete detachment from said cabinet but providing for movement thereof with said endless members up and down in said guideways to the bottom portion of said cabinet, and means at the bottom portion of said cabinet for supporting a withdrawn tray in position for the use of the records housed therein.

20. A card index file, comprising a cabinet having an open front, a series of card index trays slidably mounted in said cabinet one above another for withdrawal through said open front, guideways at the front of said cabinet in advance of and at the sides of the front ends of said trays extending from the top to the bottom portions of said cabinet, endless members mounted in the sides of said cabinet at opposite sides of said trays for lineal movement therein having one section of each member lineally movable in said guideways and having another section of said members movable in a plane inclined to the horizontal, inclined runways mounted in the sides of said cabinet parallel with the inclined sections of said endless members, weights attached to the inclined sections of said endless members in the sides of said cabinet and slidable on said runways normally adapted to operate said endless members into a position where said weights are at the lower ends of said runways, a plurality of holders mounted on said endless members on the sections thereof normally engaged in said guideways and arranged to provide holders on each endless member aligned with each tray and said cabinet in the normal position thereof, cooperating means on the rear ends of each tray for engaging in said holders in the withdrawn position of a tray for cooperation with said holders in the withdrawn position of a tray for cooperation with said holders and guideways to retain a withdrawn tray against complete detachment from said cabinet but providing for movement thereof with said endless members up and down in said guideways to the bottom portion of said cabinet, supporting means slidable in the bottom of said cabinet to a projected position in front of said cabinet for supporting a withdrawn tray in substantially horizontal position when moved to the lower ends of said guideways, and a follower slidable in said cabinet adjacent said supporting means for detachable cooperation with the cooperating means on each tray at the lower ends of said guideways for supporting a withdrawn tray for further withdrawal outwardly in front of said cabinet with the sliding movement of said follower therewith during support on said supporting means, said follower retaining said endless members against lineal movement during the projected position thereof from said cabinet whereby a withdrawn tray is supported in a convenient position for reference to the records housed therein.

21. A card index file, comprising a cabinet formed of an inner supporting unit and an outer removable casing enclosing said unit, said cabinet having an open front, a series of card index trays slidably mounted in the inner unit in said cabinet for withdrawal through said open front, guideways on the front end of said inner unit in advance of the front ends of said trays and at the sides thereof extending from the top to the bottom portions of said cabinet, lineally movable members mounted in said guideways and having the opposite ends extending beyond the ends of said guideways and supported for movement in said guideways by said inner unit on the outer sides thereof between said inner unit and said outer casing, a plurality of holders on said lineally movable members slidable in said guideways with said members and arranged to align with the trays in said cabinet wherein each holder is adapted to receive one of said trays therein, cooperating means on each tray for engaging in the holders aligned therewith for cooperation and supporting a withdrawn tray for movement up and down in said guideways and against complete detachment from said cabinet, and means for supporting a withdrawn tray at the lower ends of said guideways in substantially horizontal position for reference to the records housed therein.

22. A card index file, comprising a cabinet formed of an inner unit and an outer casing enclosing said inner unit and providing an open front in said cabinet, a series of card index trays slidably mounted in said cabinet one above another for withdrawal through said open front, guideways formed on said inner unit at the front and sides of said trays in advance of the front ends of said trays and extending from the top to the bottom portions of said cabinet, wheels rotatably mounted on the outer faces of said inner unit within said casing at opposite ends of said guideways, a pair of endless members engaged over the wheels on opposite sides of said inner unit having the sections extending between said wheels engaging in said guideways, means supporting the remainder of said endless members on the outer side of said inner unit for lineal travel in said cabinet, a plurality of holders mounted on each of said endless members and normally supported in said guideways in alignment with the trays in said cabinet, each adapted to receive one of said trays in withdrawn position thereof, cooperating means on each tray for engaging in said holders in the withdrawn position of a tray, said cooperating means and holders cooperating to provide for movement of a withdrawn tray up and down in front of said cabinet cooperating to provide for the movement of a withdrawn tray up and down in said guideways, means at the bottom of said cabinet for supporting a withdrawn tray in substantially horizontal position and providing for its forward movement in advance of the cabinet while attached thereto for convenient reference and use of the records in said tray, said means retaining said endless members against movement while said tray is supported at the bottom of said cabinet in forwardly projecting position.

23. A card index file, comprising a cabinet having an inner unit and an outer casing slidably mounted on said inner unit and enclosing said unit, said cabinet having an open front, a series of card index trays slidably mounted in said cabinet in substantially horizontal position one above another for withdrawal through said open front, guideways on the front end of said inner unit in advance of the front ends of said trays and at the sides of said unit extending from the top to the bottom portions thereof, wheels rotatably mounted at the upper and lower ends of said inner unit at each side thereof having one portion of the peripheries of each wheel in alignment with said guideways, a shaft rotatably mounted in the rear bottom portion of said cabinet, wheels mounted on the ends of said shaft at each side of said inner unit in aligned relation with said first-mentioned wheels at each side of said unit, endless members engaged over the wheels on each side of said unit having one section of each member lineally movable in one of said guideways and having another section of each member extending in inclined relation from the top front to the bottom rear portion of said cabinet on the outside of the sides of said inner unit, inclined runways on the outside of said inner unit at the sides thereof extending from the top front to the bottom rear portions of said inner unit within said outer casing in parallel relation to the inclined section of said endless member, a weight mounted on each inclined section of said endless members and slidable on said runway within said outer casing, said weight normally tending to operate said endless member in one direction until the weight reaches the bottom of said runway for normally supporting said endless member with the sections in said guideway in a predetermined position relative to the trays in said cabinet, a plurality of holders on each of said endless members normally guided in said guideways and arranged to normally register with one of said trays, cooperating means on the rear end of each tray for engaging in said holders in the withdrawn position of a tray to retain a withdrawn tray against complete detachment from said cabinet and providing for movement of said withdrawn tray up and down in said guideways whereby each withdrawn tray may be moved to the lower end of a guideway for support during the inspection and use of the records housed therein.

24. A card index file, comprising a cabinet having an inner unit and an outer casing slidably mounted on said inner unit and enclosing said unit, said cabinet having an open front, a series of card index trays slidably mounted in said cabinet in substantially horizontal position one above another for withdrawal through said open front, guideways on the front end of said inner unit in advance of the front ends of said trays and at the sides of said unit extending from the top to the bottom portions thereof, wheels rotatably mounted at the upper and lower ends of said inner unit at each side thereof having one portion of the peripheries of each wheel in alignment with said guideways, a shaft rotatably mounted in the rear bottom portion of said cabinet, wheels mounted on the ends of said shaft at each side of said inner unit in aligned relation with said first-mentioned wheels at each side of said unit, endless members engaged over the wheels on each side of said unit having one section of each member lineally movable in one of said guideways and having another section of each member extending in inclined relation from the top front to the bottom rear portion of said cabinet on the outside of the sides of said inner unit, inclined runways on the outside of said inner unit at the sides thereof extending from the top front to the bottom rear portions of said inner unit within said outer casing in parallel relation to the inclined section of said endless member, a weight mounted on each inclined section of said endless members and slidable on said runway within said outer casing, said weight normally tending to operate said endless member in one direction until the weight reaches the bottom of said runway for normally supporting said endless member with the sections in said guideway in a predetermined position relative to the trays in said cabinet, a plurality of holders on each of said endless members normally guided in said guideways and arranged to normally register with one of said trays, cooperating means on the rear end of each tray for engaging in said holders in the withdrawn position of a tray to retain a withdrawn tray against complete detachment from said cabinet and providing for movement of said withdrawn tray up and down in said guideways, and a closure slidable in the bottom of said cabinet in parallel relation to said trays for projecting forwardly from said cabinet in one position to receive and support a withdrawn tray at the lower end of said guideways for use and reference of the records carried thereby, said closure being slidable outwardly from said position to a closed position wherein said closure is moved out from the bottom of the cabinet and rotated upwardly to engage in the front opening for closing the same to prevent access to said trays in the cabinet.

25. A card index file, comprising a cabinet formed of an inner unit and an outer casing enclosing said unit and having an open front, said inner unit having front and rear uprights at the sides thereof, a plurality of substantially horizontally arranged parallel angle members secured to said front and rear uprights at each side of said inner unit to provide a plurality of sections in said cabinet for slidably receiving and supporting a card index tray in each section in substantially horizontal relation for slidable movement in and out of said cabinet through said open front, means connecting the upper and lower ends of said uprights at each side of said inner unit together to form a rigid tray supporting unit, guideways on said front uprights in advance of the front ends of trays housed in said unit and extending from the top to the bottom portion of said cabinet, lineally movable members supported on the uprights for said inner unit at the outside of the side portions thereof with sections of said lineally movable members engaged for lineal movement in said guideways, holders on said lineally movable members normally adapted to register with the tray compartments in said unit, cooperating means on the rear end of each tray for engaging in said holders and guideways in the withdrawn position of a tray for retaining said withdrawn tray against complete detachment from said cabinet and supporting it for movement up and down in said guideways and means at the lower ends of said guideways for supporting a withdrawn tray in a substantially horizontal position for reference and use of the records therein.

26. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions thereof, a plurality of slide members for each tray slidable in said cabinet for movement into and out of engagement with said guideways, cooperating means on each tray for engaging and operating the slide members for said tray to project them into said guideways for cooperation to guide a withdrawn tray into said guideways, said means cooperating with said guideways to retain a withdrawn tray against complete detachment from said cabinet and providing for movement of said tray up and down in said guideways between its projected slide members and one end of said guideways, and means at said last-named end of said guideways for supporting a withdrawn tray for reference to and use of the records therein.

27. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions thereof, means at each side of said cabinet for each tray therein slidable forwardly and rearwardly in said cabinet for guiding a tray during withdrawal from said cabinet and reinsertion therein into and from said guideways, said means being slidable with the withdrawal of a tray to engage said guideways, and cooperating means on each tray for engagement in said means and said guideways for retaining a withdrawn tray against complete detachment from said cabinet and providing for its movement up and down in said guideways in front of the remaining trays in said cabinet for positioning in a predetermined manner relative to said cabinet for inspection and use of the records housed therein.

28. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions thereof, means slidably mounted in the sides of said cabinet for each tray slidable in said cabinet in angular relation to said guideways, parts on said means for engaging in said guideways in the forward position thereof in said cabinet for limiting movement of a tray in said guideways in one direction, and cooperating means on each tray for operating its respective means to engage in said guideway for movement up and down in said guideway between said first-mentioned means and one end of said guideways, said cooperating means retaining a withdrawn tray against complete detachment from said cabinet in withdrawn position, a withdrawn tray being movable to one end of said guideways across the front of the remaining trays in said cabinet for positioning in a predetermined relation to provide convenient reference to and use of the records housed therein.

29. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portions thereof, slide means for each tray slidable in said cabinet into and out of engagement with said guideways having parts projecting into said guideways for limiting sliding movement of a tray therein when engaged therewith, means on each tray for engaging and operating said slide means to engage in and disengage from said guideways as said trays are respectively withdrawn and reinserted in their places in said cabinet, and cooperating means on the rear ends of each tray for traveling in said slide means and said guideways to retain a withdrawn tray against complete detachment from said cabinet and to provide for its up and down movement in said guideways between said slide means and one end of said guideways for support of said last-named end of said guideways in a predetermined position to facilitate inspection and use of the records housed therein.

30. A card index file, comprising a cabinet having an inclined front wall formed with an opening, inclined guideways formed in said cabinet at opposite sides thereof along said front wall, a plurality of card index trays slidably mounted in said cabinet in substantially horizontal position one above another for withdrawal through said open front, a plurality of slide members slidably mounted in the sides of said cabinet at opposite sides of said trays arranged for supporting and guiding each tray in its withdrawal from said cabinet into said guideways, and cooperating means on the rear ends of each tray for travel in said slide members and guideways to provide for up and down movement of a withdrawn tray in said guideways in front of the trays in said cabinet and for retaining a withdrawn tray against complete detachment from said cabinet, said cooperating means engaging and operating said slide members to project the same into said guideways for limiting upward travel of the withdrawn tray in said guideways, and means at the bottom of said cabinet for supporting a withdrawn tray at the lower ends of said guideways in forwardly projecting position beyond the front of said cabinet for use and inspection of the records therein, a withdrawn tray being movable from said supported position at the bottom of the guideways upwardly therein by manually pushing a withdrawn tray rearwardly, said slide members guiding a withdrawn tray into the compartment from which it was removed.

31. A card index file, comprising a cabinet having an open front, the front of said cabinet being inclined downwardly and forwardly from the top thereof, a plurality of card index trays slidably mounted in said cabinet in substantially horizontal position one above another for withdrawal through said open front, guideways formed at opposite sides of said opening along said front, cooperating means on the rear ends of each tray for engaging said guidsways upon the withdrawal of a tray through said open front to provide for movement of a tray up and down on said guideways and retain it against complete detachment from said cabinet, slide members for each tray mounted at the sides of said cabinet having inclined track sections on the front end thereof normally cooperating to provide a continuous inclined trackway in parallel relation to said guideways for guiding a withdrawn tray up and down along said guideways, said slide members being operated by the cooperating means on a tray being withdrawn to move into a forwardly extending position with the inclined track section thereof engaging the guideway for limiting upward movement of a withdrawn tray along said guideway and guiding it into its position in the cabinet for housing therein, said slide members being moved into their normal position by the insertion of their corresponding tray into the housed position in the cabinet, and means for supporting a withdrawn tray at the lower end of said guideways in forwardly projecting position from said cabinet for inspection and use of the records therein.

32. A card index file, comprising a cabinet having an open front formed in inclined relation with the bottom projecting forwardly beyond the top, a series of card index trays slidably mounted in said cabinet in substantially horizontal position one above another for withdrawal through said open front, guideways mounted on the front of said cabinet at opposite sides of said opening and extending from the top to the bottom thereof, a plurality of slide members slidably mounted in substantially horizontal relation on each side of said cabinet at the sides of said trays and arranged in pairs at opposite sides of said cabinet, one pair of slide members being arranged to receive and guide one tray into and out of its housed position in said cabinet, means for limiting sliding movement of said slide members in said cabinet to a rear position therein having the front ends in inclined relation parallel to said guideways and the front of said cabinet, inclined track sections on the front ends of said slide members at each side of said cabinet for cooperating with said guideways in guiding a withdrawn tray up and down along the inclined front of said cabinet and said guideways between the bottom of the cabinet and the position from which a tray is withdrawn, and means on the rear ends of each tray cooperating with said slide members to move them to a forwardly extending position with the track sections thereon engaged with said guideways to restrict movement of the tray corresponding thereto along said guideways for guiding a withdrawn tray into its housed position in the cabinet, manual operation to push a withdrawn tray rearwardly toward the cabinet causing said means to travel along the track sections of said slide members and said guideways for guiding the withdrawn tray into its housed position in the cabinet, and supporting means at the lower ends of said guideways for supporting a withdrawn tray at the bottom portion of said cabinet in forwardly projecting position therefrom for inspection and use of the records housed therein.

33. A card index file, having an inclined open front end with the bottom projecting forwardly at the front beyond the top, said cabinet being formed to provide a plurality of tray compartments arranged one above the other in substantially horizontal relation therein, a plurality of card index trays slidably mounted in said cabinet one in each compartment, guideways at the front of said cabinet along said inclined wall extending from the top to the bottom portions of said cabinet and in inclined relation parallel with said inclined front, said cabinet having portions at the sides of each compartment formed with substantially horizontal slots adjacent the forward ends thereof, a plurality of slide members having lateral projections on the outer sides thereof extending through said slots and slidably mounting said slide members in the side portions of said cabinet, said slide members being formed with guide flanges for guiding the tray in said compartment during withdrawal from and insertion therein, said slide members having track sections on the front ends thereof extending in inclined relation parallel to the inclined front end of said cabinet, said slots limiting rearward movement of said slide members in said cabinet to a normal position wherein said track sections on the front ends of all of the slide members in the cabinet are arranged in coplanar relation parallel to said guideways for cooperating therewith in guiding a tray up and down in said guideways, and rollers on the rear ends of each tray at the sides thereof for travel in said compartments, slide members and guideways to guide a tray into and out of its compartment in said cabinet, the rollers on a withdrawn tray moving the slide members guiding said tray forwardly into engagement with the front end of said cabinet to close the guideways at the front of said cabinet for limiting travel of a withdrawn tray up and down in said guideways, a withdrawn tray being movable in said guideways from its compartment in the cabinet to the lower end of the cabinet for support in a substantially horizontal position for use and reference of the records housed therein.

34. A card index file, comprising a cabinet having an inclined open front in which the bottom of said cabinet extends forwardly of the top thereof, said cabinet being formed with a plurality of tray compartments, a series of card index trays slidably mounted in said cabinet in substantially horizontal position one above another for withdrawal through said open front, one in each compartment, guideways at the front of said cabinet inclined in parallel relation with the inclination of the front of said cabinet and in advance of the front ends of said trays extending from the top to the bottom portions thereof, a plurality of slide members for each tray slidable in said cabinet for movement into and out of engagement with said guideways, said slide members normally being retained in a position wherein the front ends are parallel to said guideways and arranged in aligned relation one to the other for cooperation with said guideways in guiding a withdrawn tray up and down therein, means on each tray for travel in said slide members and guideways for guiding a tray in withdrawn position in and out of its compartment in said cabinet and up and down in said guideways to the bottom thereof for support in a substantially horizontal position for inspection and use of the records housed therein, a top cover for covering the records in the rear end of said tray hingedly mounted therein, the means on the rear ends of each tray having connections with said top cover to move it from an open position to a position in said tray overlying the rear records therein upon rearward manual movement of said tray toward said cabinet to move said tray and said guideways toward the compartments therefor in said cabinet.

35. A card index file, comprising a cabinet having an open front, a series of card index trays slidably mounted in said cabinet in substantially horizontal position one above another for withdrawal through said open front, said cabinet having the open front in inclined relation with the bottom extending forwardly beyond the top thereof, guideways at the front of said cabinet inclined with the front thereof in advance of the front ends of said trays and extending from the top to the bottom portions of said cabinet, a plurality of slide members for each tray slidable in said cabinet for movement into and out of engagement with said guideways and normally arranged with the front ends thereof in spaced parallel relation to said guideways for cooperation therewith to guide a withdrawn tray up and down in said guideways, the front ends of each of said slide members being in aligned relation with one another, cooperating means on the rear ends of each tray for travel in said slide members and guideways adapted to engage and operate the slide members for said tray to project them into said guideways for cooperation to guide a withdrawn tray into said guideways so that it may be moved to the lower end thereof, and a closure for said cabinet fitting the open front thereof in closed position to prevent access to the trays in said cabinet and movable into an open position at the bottom of the cabinet with one end projecting forwardly from the front thereof in substantially horizontal relation and providing a support for a withdrawn tray at the lower end of said guideways in position to provide for reference and use of the records in said tray, the movement of a tray into its compartment from a withdrawn position operating said slide members to move them into their normal position with the front ends in aligned relation.

36. A card index file, comprising a cabinet having an open front, a series of card index trays slidably mounted in said cabinet in substantially horizontal position one above another for withdrawal through said open front, guideways at the front of said cabinet in advance of the front ends of said trays extending from the top to the bottom portion thereof, means mounting said guideways in the front of said cabinet for relative movement to the front of said cabinet for projection beyond the front wall of said cabinet and support in said projected position, slide members slidably mounted in substantially horizontal position in said cabinet one slide member being adapted to support one of said trays and slidable from a housed position in said cabinet to project forwardly thereof into engagement with said guideway, and means on each tray for travel in the slide member for said tray for guiding said tray into forwardly projecting withdrawn position from said cabinet and into engagement with said guideways for travel up and down in said guideways whereby a withdrawn tray engaged in said guideways may be moved to the lower ends thereof for support in a substantially horizontal position for inspection and use of the records in said tray.

37. A card index cabinet, comprising a cabinet having an open front, a plurality of slide members slidably mounted in said cabinet for projection outwardly in substantially horizontal relation from said cabinet beyond the front thereof, a card index tray slidably mounted in each slide member for withdrawal therefrom through the open end of said cabinet, guideways movably mounted at the front of said cabinet in advance of the front ends of said trays in housed position for movement outwardly in front of said cabinet, means for supporting said guideways on said cabinet for said outward movement into an operative position in inclined relation, and means on each card index tray for travel in said slide members upon withdrawal of a tray therefrom to operate said slide member to a forwardly extending position in front of said cabinet for interengagement with said guideways to guide a withdrawn tray into said guide members for movement up and down in said guideways, a withdrawn tray engaged in said guideways being movable to the bottom of said guideways for support in forwardly extending position in front of said cabinet for use and inspection of the records housed therein, said tray being manually movable from the forwardly projecting position by rearward manual movement of said tray in said guide members, the means thereon causing the rear end of the tray to move upwardly in said guide members for engagement with its projected slide member and guiding therein for movement into the housed position in said slide member and the movement of said slide member therewith into housed position in said cabinet.

38. A card index file, comprising a cabinet having an open front, a plurality of slide members slidably mounted in said cabinet for movement to project through said open front, a card index tray in its slide member slidable therein and adapted for withdrawal through said open front to project beyond the front of said cabinet, a pair of guideways at opposite sides of the front of said cabinet extending from the top to the bottom portion thereof, means mounting said guideways in the front of said cabinet for movement to project beyond the front of the cabinet and for support in said position projecting in front of said cabinet, each of said guideways having a series of movable sections formed therein in alignment with said slide members, means on the rear end of each tray for travel in said slide members in said guideways, means actuated by the withdrawal of a tray from said cabinet for projecting the forward end of its slide member into engagement with said guideway for moving the aligned sections thereof laterally to receive the forward end of said slide member in said guideway to limit the upward travel of a withdrawn tray in said guideways, the means on the rear end of said tray retaining a withdrawn tray in engagement with said guideways and against complete detachment from said cabinet, for travel up and down in said guideways adapted to provide for the movement of a withdrawn tray to the lower end of said guideways for support during reference and use of the records carried thereby, said tray being adapted to actuate said slide member to its housed position in the cabinet when a withdrawn tray is returned from its position at the lower ends of said guideways to its housed position in said slide member.

39. A card index file, comprising a cabinet having an open front, a series of slide members mounted in said cabinet in substantially horizontal relation one above another for limited sliding movement to project the front ends outwardly in front of said cabinet, a series of card index trays slidably mounted one in each slide member in said cabinet, guideways at the front of said cabinet in advance of the front ends of said trays and slide members extending from the top to the bottom portions thereof, means for mounting said guideways for movement into a housed position within the front of said cabinet in inoperative relation therewith and to a forwardly projecting position spaced outwardly in advance of the front of said cabinet in inclined relation with the lower ends projecting forwardly beyond the upper ends, a supporting member at the bottom of said cabinet mounting the lower ends of said guideways on opposite sides thereof, said supporting member being slidably mounted in said cabinet for movement outwardly to project at substantially horizontal positions beyond the front of said cabinet and support the lower ends of said guideways in said forwardly projected position thereon, said guideways being supported by said supporting member at a position spaced rearwardly from the forwardly projecting end thereof, means mounted on the rear ends of each tray for travel in said slide member at said guideways operable to project a slide member into engagement with said guideways when the tray therein is withdrawn from said cabinet and for guiding the rear end of said tray up and down in said guideways in withdrawn relation for movement to the lower ends of said guideways and support on said supporting member in substantially horizontal position for reference and use of the records housed therein.

40. A card index file, comprising a cabinet having an open front and formed with a plurality of superimposed adjacent horizontal tray compartments; a plurality of card index trays slidably mounted one in each compartment in substantially horizontal position one above the other in superimposed relation for withdrawal from the housed position in the cabinet through said open front; a pair of guideways mounted at the front of said cabinet in spaced parallel relation and extending from the top to the bottom portions thereof; a plurality of track sections in front of said trays cooperating with said guideways; roller guide means on the rear end of each tray engaging cabinet carried parts in said compartments and said guideways and track sections when a tray is withdrawn from its compartment for retaining said trays attached to said cabinet for guided movement between housed position in a compartment in said cabinet and a reference and posting position at the lower front portion of said cabinet; and guide members carried by said cabinet cooperating with said guideways, said cabinet carried parts and said roller guide means on said trays for guiding said roller guide means in movement of a tray between housed and posting positions from said cabinet carried parts to said guideways, said guide members being operated by a withdrawn tray for cooperating with said guideways to limit movement of a withdrawn tray therein to the portion of the guideways between the compartment from which the tray is withdrawn and the posting position, and preventing another tray from being withdrawn and inserted in other than its assigned compartment.

References Cited in the file of this patent

UNITED STATES PATENTS

| Number | Name | Date |
|---|---|---|
| 617,965 | Lippincott et al. | Jan. 17, 1899 |
| 759,335 | Wheeland | May 10, 1904 |
| 893,563 | Basler | July 14, 1908 |
| 1,394,469 | Case | Oct. 18, 1921 |
| 1,429,627 | Rand | Sept. 19, 1922 |
| 1,517,707 | Castleman | Dec. 2, 1924 |
| 1,891,377 | Furlong | Dec. 20, 1932 |
| 1,891,381 | Furlong | Dec. 20, 1932 |
| 2,238,004 | Wolters | Apr. 8, 1941 |
| 2,333,097 | Duboc | Nov. 2, 1943 |
| 2,479,735 | Duspiva | Aug. 23, 1949 |
| 2,526,823 | Mansfield | Oct. 24, 1950 |
| 2,553,003 | Popoff | May 15, 1951 |

FOREIGN PATENTS

| Number | Country | Date |
|---|---|---|
| 589,605 | France | Feb. 25, 1925 |